US011511826B2

(12) United States Patent
Nichols

(10) Patent No.: US 11,511,826 B2
(45) Date of Patent: Nov. 29, 2022

(54) BICYCLE AXLE ASSEMBLY INCLUDING A POWER METER

(71) Applicant: SRAM, LLC, Chicago, IL (US)

(72) Inventor: Geoff Nichols, San Luis Obispo, CA (US)

(73) Assignee: SRAM, LLC, Chicago, IL (US)

( * ) Notice: Subject to any disclaimer, the term of this patent is extended or adjusted under 35 U.S.C. 154(b) by 455 days.

(21) Appl. No.: 16/708,360

(22) Filed: Dec. 9, 2019

(65) Prior Publication Data
US 2021/0171153 A1 Jun. 10, 2021

(51) Int. Cl.
| | |
|---|---|
| *B62M 6/50* | (2010.01) |
| *B62M 1/36* | (2013.01) |
| *B62M 6/55* | (2010.01) |
| *B62M 3/00* | (2006.01) |
| B62J 45/40 | (2020.01) |
| B62J 50/25 | (2020.01) |
| G01L 5/16 | (2020.01) |

(52) U.S. Cl.
CPC .............. *B62M 6/50* (2013.01); *B62M 1/36* (2013.01); *B62M 3/00* (2013.01); *B62M 6/55* (2013.01); *B62J 45/40* (2020.02); *B62J 50/25* (2020.02); *G01L 5/16* (2013.01)

(58) Field of Classification Search
CPC . B62M 6/50; B62M 1/36; B62M 3/00; B62M 6/55; B62J 50/25; B62J 45/40; G01L 5/16
USPC ..................................................... 73/862.338
See application file for complete search history.

(56) References Cited

U.S. PATENT DOCUMENTS

| | | | |
|---|---|---|---|
| 4,651,402 A * | 3/1987 | Bonfils | G01G 19/07 29/446 |
| 5,186,042 A | 2/1993 | Miyazaki | |
| 5,361,649 A | 11/1994 | Slocum, Jr. | |
| 6,032,520 A | 3/2000 | Miyazaki | |
| 6,356,847 B1 | 3/2002 | Gerlitzki | |
| 6,402,257 B1 * | 6/2002 | Chen | B60B 27/0078 301/110.5 |
| 6,418,797 B1 | 7/2002 | Ambrosina et al. | |
| 6,629,574 B2 | 10/2003 | Turner | |
| 7,055,382 B2 | 6/2006 | Miyazaki | |
| 7,585,237 B2 * | 9/2009 | Fukuda | B62M 9/125 411/383 |
| 7,775,128 B2 | 8/2010 | Roessingh et al. | |
| 7,861,599 B2 | 1/2011 | Meggiolan | |
| 8,117,923 B2 | 2/2012 | Sasaki | |
| 9,097,598 B2 | 8/2015 | Grassi | |

(Continued)

FOREIGN PATENT DOCUMENTS

| | | |
|---|---|---|
| CN | 101279630 A | 10/2008 |
| CN | 101881674 A | 11/2010 |

(Continued)

*Primary Examiner* — Octavia Davis Hollington

(57) ABSTRACT

An axle assembly for a bicycle includes an axle having an inner wall extending along a length of the axle between a first end and a second end of the axle. The inner wall at least partially defines a first volume and a second volume within the axle. The first volume has a first diameter, and the second volume has a second diameter that is greater than the first diameter. The first volume is closer than the second volume to the first end of the axle. The axle assembly also includes a sensor attached to the inner wall of the axle within the second volume of the axle.

20 Claims, 11 Drawing Sheets

(56) References Cited

U.S. PATENT DOCUMENTS

| | | |
|---|---|---|
| 9,581,508 B2 | 2/2017 | Tetsuka et al. |
| 9,810,593 B2 | 11/2017 | Vergara |
| 9,969,451 B2 | 5/2018 | Sasaki |
| 10,184,849 B2 | 1/2019 | Jennings |
| 10,526,041 B2 | 1/2020 | Hara |
| 2006/0120208 A1 | 6/2006 | Kim |
| 2007/0000336 A1 | 1/2007 | Berdichevsky et al. |
| 2009/0120208 A1 | 5/2009 | Meyer |
| 2010/0006760 A1 | 1/2010 | Lee et al. |
| 2010/0024590 A1 | 2/2010 | O'Neill |
| 2010/0093494 A1 | 4/2010 | Smith |
| 2010/0263468 A1 | 10/2010 | Fisher |
| 2010/0282001 A1 | 11/2010 | Sasaki |
| 2011/0041626 A1 | 2/2011 | Tuulari et al. |
| 2012/0090424 A1 | 4/2012 | Curran et al. |
| 2012/0234108 A1* | 9/2012 | Janecek .................. B62J 45/42 73/862.338 |
| 2013/0014596 A1* | 1/2013 | Hsu ....................... G01L 3/1435 73/862.635 |
| 2013/0024137 A1* | 1/2013 | Grassi ...................... G01L 1/00 702/43 |
| 2014/0121049 A1* | 5/2014 | Nishikawa ............... B62M 6/55 74/413 |
| 2014/0165744 A1* | 6/2014 | Lull ................... A63B 24/0087 73/862.338 |
| 2016/0052583 A1 | 2/2016 | Sasaki |
| 2017/0368871 A1 | 12/2017 | Ebersbach |
| 2018/0354580 A1 | 12/2018 | Hara |

FOREIGN PATENT DOCUMENTS

| | | | |
|---|---|---|---|
| CN | 103303425 A | | 9/2013 |
| CN | 105383631 A | | 3/2016 |
| CN | 205352592 U | | 6/2016 |
| CN | 105818921 A | | 8/2016 |
| CN | 109080758 A | | 12/2018 |
| DE | 4435174 A1 | | 3/1996 |
| EP | 0909940 A2 | | 4/1999 |
| EP | 1978342 A2 | | 10/2008 |
| EP | 1978343 A2 | | 10/2008 |
| EP | 2225543 A1 | | 9/2010 |
| EP | 102018001253 | * | 9/2018 |
| GB | 2216671 A | | 10/1989 |
| WO | 1989000401 A1 | | 1/1989 |
| WO | 2009079980 A1 | | 7/2009 |
| WO | 2010000369 A1 | | 1/2010 |
| WO | 2010088888 A2 | | 8/2010 |

* cited by examiner

BICYCLE AXLE ASSEMBLY INCLUDING A POWER METER

BACKGROUND

1. Field of the Disclosure

The present disclosure is generally directed to an axle assembly for a bicycle, and more particularly, to an axle assembly including a power meter.

2. Description of Related Art

A power meter for a bicycle determines power output by a rider of the bicycle. The power meter includes a strain gauge that measures torque applied to a component of the bicycle on which the strain gauge is positioned. For example, the power meter may be a crank-based power meter that includes a strain gauge that is positioned on an outer surface of the spindle. The crank-based power meter measures torque applied to a spindle. For such a crank-based power meter, the power output by the rider may be calculated based on the measured torque and an angular velocity of the spindle.

SUMMARY

In one example, an axle assembly for a bicycle includes an axle having an inner wall extending along a length of the axle between a first end and a second end of the axle. The inner wall at least partially defines a first volume and a second volume within the axle. The first volume has a first diameter, and the second volume has a second diameter that is greater than the first diameter. The first volume is closer than the second volume to the first end of the axle. The axle assembly also includes a sensor attached to the inner wall of the axle within the second volume of the axle.

In one example, the axle assembly further includes a sensor assembly. The sensor assembly includes a fixed portion. The fixed portion includes the sensor, and at least part of the fixed portion is positionally fixed relative to the axle. The sensor of the fixed portion of the sensor assembly is disposed entirely within the second volume of the axle.

In one example, the sensor assembly further includes a removable portion. The removable portion is removably attachable and electrically connectable to the fixed portion. At least part of the removable portion of the sensor assembly is disposed within the first volume of the axle.

In one example, the sensor assembly is a power meter, and the sensor is a strain gauge.

In one example, the strain gauge is a first strain gauge. The fixed portion of the sensor assembly further includes a second strain gauge. The first strain gauge and the second strain gauge are attached to the inner wall within the second volume of the axle, such that the first strain gauge and the second strain gauge are opposite each other.

In one example, the removable portion of the sensor assembly includes a power source electrically connectable to the first strain gauge and the second strain gauge.

In one example, the fixed portion of the sensor assembly further includes a circuit board electrically connected to the first strain gauge and the second strain gauge. The power source is electrically connected to the first strain gauge and the second strain gauge via the circuit board.

In one example, the fixed portion of the sensor assembly further includes a memory electrically connected to the circuit board. The memory is configured to store calibration data for the sensor assembly.

In one example, the fixed portion of the sensor assembly further includes an analog-to-digital (A/D) converter supported by the circuit board, the A/D converter is in communication with the first strain gauge and the second strain gauge. The first strain gauge is configured to generate a first analog signal, and the second strain gauge is configured to generate a second analog signal. The first analog signal and the second analog signal are analog representations of strain on the axle, respectively. The A/D converter is configured to convert the first analog signal to a first digital signal, convert the second analog signal to a second digital signal, generate a third digital signal that is based on the first analog signal and the second analog signal, or any combination thereof. The first digital signal, the second digital signal, and the third digital signal are digital representations of strain on the axle, respectively. The fixed portion of the sensor assembly is configured to transmit the first digital signal, the second digital signal, the third digital signal, or any combination thereof to the removable portion of the sensor assembly when the removable portion of the sensor assembly is electrically connected to the fixed portion of the sensor assembly.

In one example, the fixed portion of the sensor assembly further includes an amplifier in communication with the first strain gauge and the second strain gauge. The first strain gauge is configured to generate a first analog signal, and the second strain gauge is configured to generate a second analog signal. The first analog signal and the second analog signal are analog representations of strain on the axle, respectively. The amplifier is configured to amplify the first analog signal to a first amplified analog signal, amplify the second analog signal to a second amplified analog signal, amplify a signal based on the first analog signal and the second analog signal to a third amplified analog signal, or any combination thereof. The fixed portion of the sensor assembly is configured to transmit the first amplified analog signal, the second amplified analog signal, the third amplified analog signal, or any combination thereof to the removable portion of the sensor assembly when the removable portion of the sensor assembly is electrically connected to the fixed portion of the sensor assembly.

In one example, the fixed portion of the sensor assembly includes a radially expandable applicator attached to the first strain gauge and the second strain gauge. The radially expandable applicator is operable to move the first strain gauge and the second strain gauge radially outwards until the first strain gauge and the second strain gauge are physically connected to the inner wall.

In one example, the fixed portion of the sensor assembly further includes a first layer of adhesive disposed on the first strain gauge and a second layer of adhesive disposed on the second strain gauge. The first strain gauge and the second strain gauge are attached to the inner wall of the axle via the first layer of adhesive and the second layer of adhesive, respectively.

In one example, the fixed portion of the sensor assembly further includes a first layer of material having a first side and a second side opposite the first side. The first side of the first layer of material is attached to the radially expandable applicator, and the second side of the first layer of material is attached to the first strain gauge. A second layer of material has a first side and a second side opposite the first side. The first side of the second layer of material is attached to the radially expandable applicator, and the second side of the second layer of material is attached to the second strain gauge.

In one example, the first layer of material and the second layer of material are made of rubber or silicon.

In one example, the fixed portion of the sensor assembly further includes a base attached to the inner wall of the axle. The radially expandable applicator is physically connected to the base, such that a depth of the radially expandable applicator relative to the first end of the axle is fixed and a clocking of the radially expandable applicator is fixed relative to the inner wall.

In one example, a crankset for a bicycle includes an axle having an inner wall extending along a length of the axle between a first end and a second end of the axle. The inner wall at least partially defines a first volume and a second volume within the axle. The first volume has a first diameter, and the second volume has a second diameter that is greater than the first diameter. The first volume is closer than the second volume to the first end of the axle. The crankset also includes a first arm attached to the axle at the first end of the axle, a second arm attached to the axle at the second end of the axle, at least one crank attached to the first arm or the second arm, and a sensor assembly. The sensor assembly includes a fixed portion. At least part of the fixed portion is positionally fixed relative to the inner wall of the axle. The fixed portion includes a sensor that is attached to the inner wall of the axle within the second volume of the axle.

In one example, the sensor is a first strain gauge. The fixed portion of the sensor assembly further includes a second strain gauge. The first strain gauge and the second strain gauge are attached to the inner wall within the second volume of the axle, such that the first strain gauge and the second strain gauge are opposite each other.

In one example, the fixed portion of the sensor assembly further includes a radially expandable applicator operable to move the first strain gauge and the second strain gauge radially outwards into contact with the inner wall. The first strain gauge and the second strain gauge each have a first side and a second side opposite the first side. The fixed portion of the sensor assembly also includes a first layer of material having a first side and a second side opposite the first side. The first side of the first layer of material is attached to the radially expandable applicator, and the second side of the first layer of material is attached to the first side of the first strain gauge. The fixed portion of the sensor assembly includes a second layer of material having a first side and a second side opposite the first side. The first side of the second layer of material is attached to the radially expandable applicator, and the second side of the second layer of material is attached to the first side of the second strain gauge. The fixed portion of the sensor assembly also includes a first layer of adhesive disposed on the second side of the first strain gauge and a second layer of adhesive disposed on the second side of the second strain gauge. The first strain gauge and the second strain gauge are attached to the inner wall of the axle via the first layer of adhesive and the second layer of adhesive, respectively.

In one example, the sensor assembly further includes a removable portion that is removably attachable and electrically connectable to the fixed portion of the sensor assembly.

In one example, an axle for a bicycle includes an inner wall extending along a length of the axle between a first end and a second end of the axle. The inner wall at least partially defines a first volume and a second volume within the axle. The first volume has a first diameter, and the second volume has a second diameter that is greater than the first diameter. The first volume is closer than the second volume to the first end of the axle. The axle also includes a first sensor attached to the inner wall within the second volume, and a second sensor attached to the inner wall within the second volume. The second sensor is opposite the first sensor.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

For crank-based power meters of the prior art, the strain gauge is positioned on an external diameter of the spindle. Such positioning exposes the strain gauge to possible damage during installation of the crank on the bicycle and exposes the strain gauge to the environment. Further, crank-based power meters of the prior art are charged by plugging the entire bicycle into an electrical power outlet. The present disclosure provides examples of axle assemblies and crank-based power meters that solve or improve upon one or more of the disadvantages described above with prior known power meters.

A bicycle axle assembly of the present embodiments includes an axle (e.g., a spindle) in which strain gauges are disposed. The strain gauges are attached to an inner surface of the spindle, such that the strain gauges are protected from the environment and damage during crank installation. By mounting the strain gauges inside the spindle, the spindle does not require a hole through which gauge signal and power wires may pass.

The strain gauges are part of a sensor assembly (e.g., a power meter) that includes a fixed portion and a removable portion. The fixed portion, at least part of which is positionally fixed relative to the axle, includes the strain gauges, and the removable portion includes a power source that powers the strain gauges. The removable portion may be removed from the bicycle for charging, such that the entire bicycle does not need to be plugged into an electrical power outlet to charge the sensor assembly.

Figure 1:
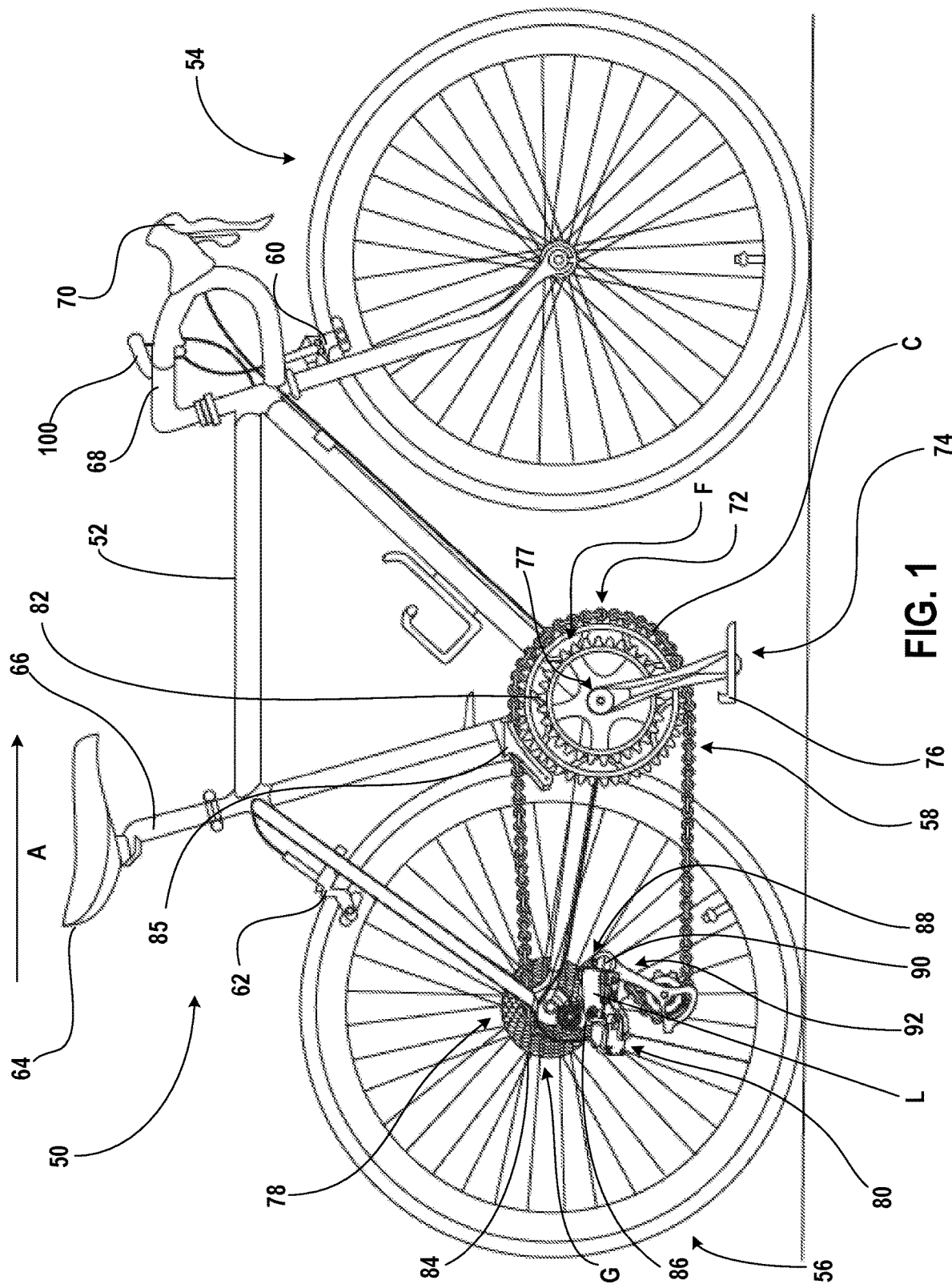
FIG. 1 is a side view schematic of a bicycle that may be constructed to utilize an axle assembly in accordance with the teachings of this disclosure.

Turning now to the drawings, FIG. 1 illustrates an example of a human powered vehicle 50 that may include the disclosed axle assembly. In FIG. 1, the human powered vehicle 50 is a first type of bicycle, such as a road bicycle. While the bicycle 50 depicted in FIG. 1 is a road bicycle (e.g., with mechanical (cable, hydraulic, and/or pneumatic) or non-mechanical (wired and/or wireless) drive systems), the axle assembly, including the specific embodiments and examples disclosed herein as well as alternative embodiments and examples, may be implemented on other types of vehicles or bicycles. For example, the disclosed axle assembly may be used on other types of two-, three-, and four-wheeled human powered vehicles such as, for example, a mountain bicycle (e.g., with full or partial suspensions), as well.

The bicycle 50 includes a frame 52, a front wheel 54, and a rear wheel 56 each rotatably attached to the frame 52, and a drivetrain 58. A front brake 60 is provided for braking the front wheel 54, and a rear brake 62 is provided for braking the rear wheel 56. The bicycle 50 also generally has a seat 64 near a rear end of the frame 52 and carried on an end of a seat tube 66 connected to the frame 52. The bicycle 50 also has handlebars 68 near a forward end of the frame 52. The handlebars 68 are attached to the frame 52 for user, or rider, control of the bicycle 50. A brake lever 70 is carried on the handlebars 68 for actuating one of the front brake 60 or rear brake 62, or both. If the brake lever 70 actuates only the front brake 60 or the rear brake 62, a second brake lever (not shown) may also be provided to actuate the other brake. A front and/or forward riding direction or orientation of the bicycle 50 is indicated by the direction of the arrow A in FIG. 1. As such, a forward direction for the bicycle 50 is indicated by the direction of arrow A.

The drivetrain 58 has a chain C and a front sprocket assembly 72, which is coaxially mounted with a crank assembly 74 having pedals 76. The front sprocket assembly 72 and at least a portion of the crank assembly 74 (e.g., excluding the pedals 76) form a crankset 77. The drivetrain 58 also includes a rear sprocket assembly 78 coaxially mounted with the rear wheel 56 and a rear gear change mechanism, such as a rear derailleur 80.

Figure 2:
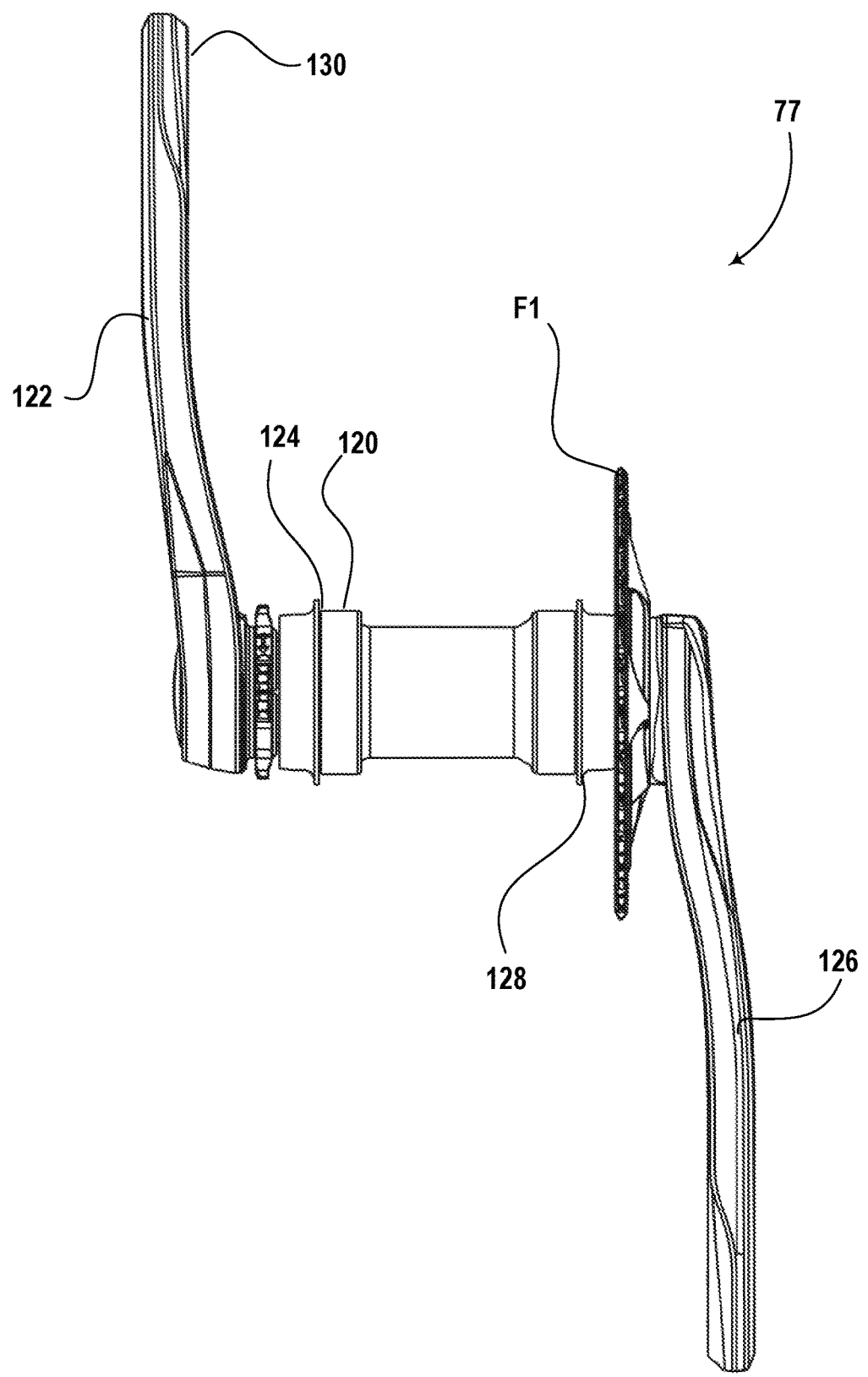
FIG. 2 is a top view of a crankset for a bicycle, such as the bicycle of FIG. 1.

As is illustrated in FIG. 1, the front sprocket assembly 72 may include one or more coaxially mounted chain rings, gears, or sprockets. In the example of FIG. 1, the front sprocket assembly 72 has two such sprockets, F1 and F2, each having teeth 82 around a respective circumference. In the example of FIG. 2, the front sprocket assembly 72 has one such sprocket F1, having teeth 82 around a circumference of the sprocket F1. As is illustrated in FIG. 1, the rear sprocket assembly 78 may include a plurality of coaxially mounted gears, cogs, or sprockets G1-GN (e.g., eleven sprockets). Each sprocket G1-GN also has teeth 84 arranged around a respective circumference. Referring to FIG. 1, the number of teeth 82 on the smaller diameter front sprocket F2 may be less than the number of teeth 82 on the larger diameter front sprocket F1. The number of teeth 84 on the rear sprockets G1-GN may gradually decrease from the largest diameter rear sprocket G1 to the smallest diameter sprocket GN. As shown in FIG. 1, a front gear changer 85 may be operated to move from a first operating position to a second operating position to move the chain C between the front sprockets F1 and F2. Likewise, the rear derailleur 80 may be operable to move between a number of different operating positions (e.g., eleven operating positions) to switch the chain C to a selected one of the rear sprockets G1-GN. In an embodiment, the rear sprocket assembly 78 may have more or fewer sprockets. For example, in an embodiment, a rear sprocket assembly may have twelve or thirteen sprockets. Dimensions and configuration of the rear derailleur 80 may be modified to accommodate a specific implemented plurality of sprockets. For example, an angle and length of the linkage and/or the configuration of the cage of the rear derailleur 80 may be modified to accommodate specific sprocket combinations.

The rear derailleur 80 is depicted in these examples as a wireless, electrically actuated rear derailleur mounted or mountable to the frame 52, or frame attachment, of the bicycle 50. The electric rear derailleur 80 has a base member 86 (e.g., a b-knuckle) that is mounted to the bicycle frame 52. A linkage 88 has two links L that are pivotally connected to the base member 86 at a base member linkage connection portion. A movable member 90 (e.g., a p-knuckle) is connected to the linkage 88. A chain guide assembly 92 (e.g., a cage) is configured to engage and maintain tension in the chain and is pivotally connected to a part of the movable member 90. The cage 92 may rotate or pivot about a cage rotation axis in a damping direction and a chain tensioning direction.

A motor module is carried on the electric rear derailleur 80 and has a battery. The battery supplies power to the motor module. In one example, the motor module is located in the movable member 90. However, the motor module may instead be located elsewhere, such as in one of the links L of the linkage 88 or in the base member 86. The motor module may include a gear mechanism or transmission. As is known in the art, the motor module and gear mechanism may be coupled with the linkage 88 to laterally move the cage 92 and thus switch the chain C among the rear sprockets on the rear sprocket assembly 78.

The battery may instead be an alternate power supply or power source and may operate other electric components of the bicycle 50 within a linked system. In one example, the battery alone powers all electric components of the bicycle 50 (e.g., a drive motor for an electrically powered bicycle), including the rear derailleur 80. In other examples, multiple power supplies, which may collectively or individually power the electric components of the system, including the rear derailleur 80, may be provided. Additional batteries or other power supplies may be attached to the rear derailleur 80 or located at other positions, such as the frame 52. In this example, however, the battery is configured to be attached directly to the rear derailleur 80, and to provide power to the components of the rear derailleur 80. In an embodiment, the rear derailleur is configured such that the battery provides power to only the components of the rear derailleur 80.

A control device 100 is mounted to the handlebars 68 for wirelessly actuating the motor module and operating the rear derailleur 80 for executing gear changes and gear selection. Multiple control devices 100 may be used with the bicycle 50. In other embodiments, the control device 100 may be located in other locations on the bicycle 50 or, alternatively, may be distributed among various components of the bicycle 50, with routing of a communication link to accommodate necessary signal and power paths. The control device 100 may also be located in places other than on the bicycle 50, such as, for example, on a rider's wrist or in a jersey pocket. The communication link may include wires, may be wireless, or may be a combination thereof. In one example, the control device 100 may be integrated with the rear derailleur 80 to communicate control commands between components. The control device 100 may include a processor, a communication device (e.g. a wireless communication device), a memory, and one or more communication interfaces.

The handlebars 68 of FIG. 1 illustrates a drop bar assembly; however, the control device 100 may be used with other types of handlebar assemblies as well, such as an aero-bar configuration, bullhorn bars, riser bars, or any other type of bicycle handlebar. Also, while the embodiments described herein describe control devices attached to handlebars, a person having experience in the art would recognize the possible positioning of control devices 100 at other areas of the bicycle 50, such as locations throughout the frame 52.

The control device 100 is configured to actuate or otherwise control components of the bicycle 50. For example, the control device 100 may be configured to control gear shifting of the front gear changer 85 and/or the rear derailleur 80. The control device 100 may also receive and/or send data to one or more components of the bicycle. For example, the control device 100 may be configured to receive data from one or more sensors of an axle assembly of the crankset 77. For example, the control device 100 may be configured to receive data from a power meter included within the axle assembly of the crankset 77.

Figure 3:
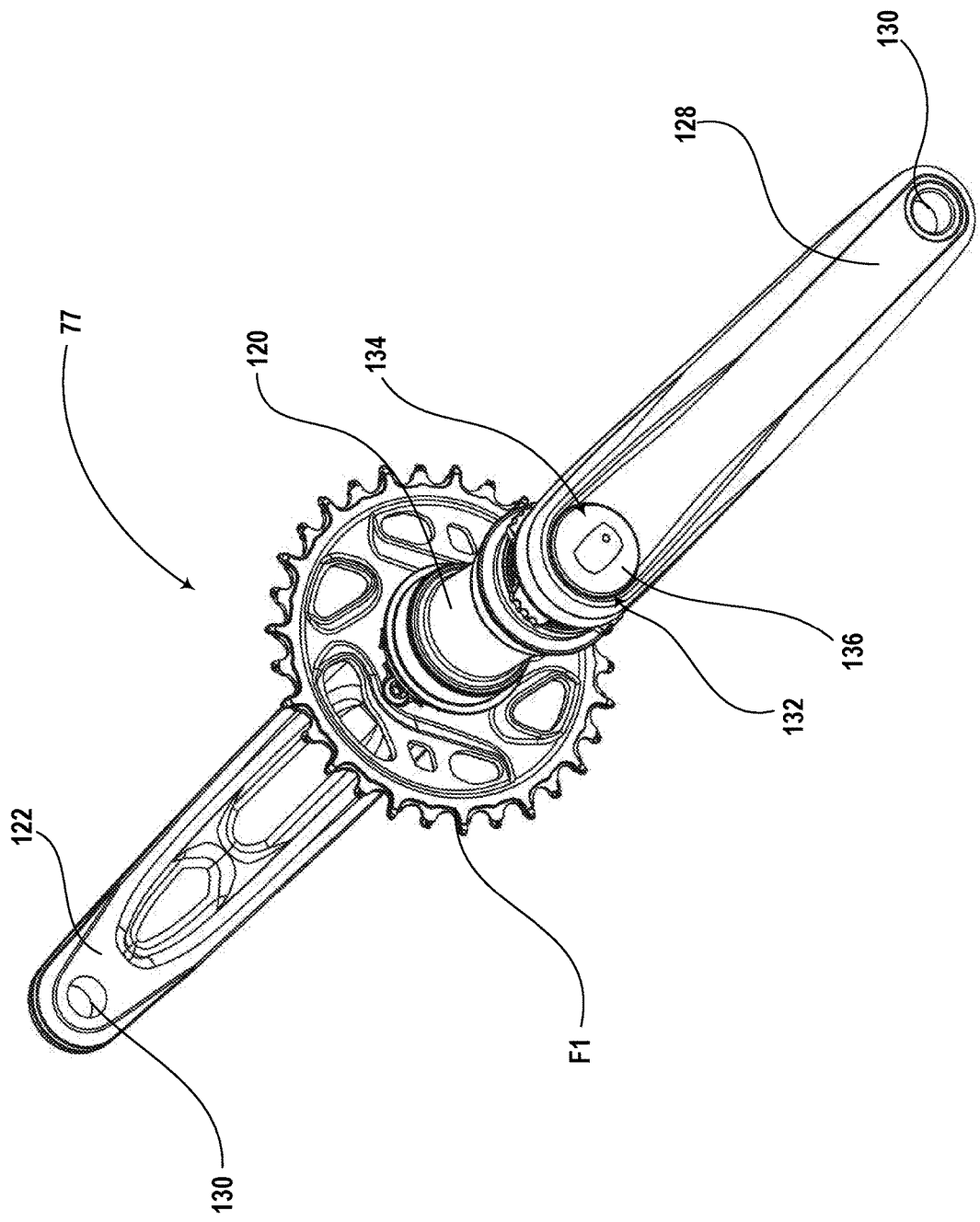
FIG. 3 is a perspective view of the crankset of FIG. 2.
Figure 4:
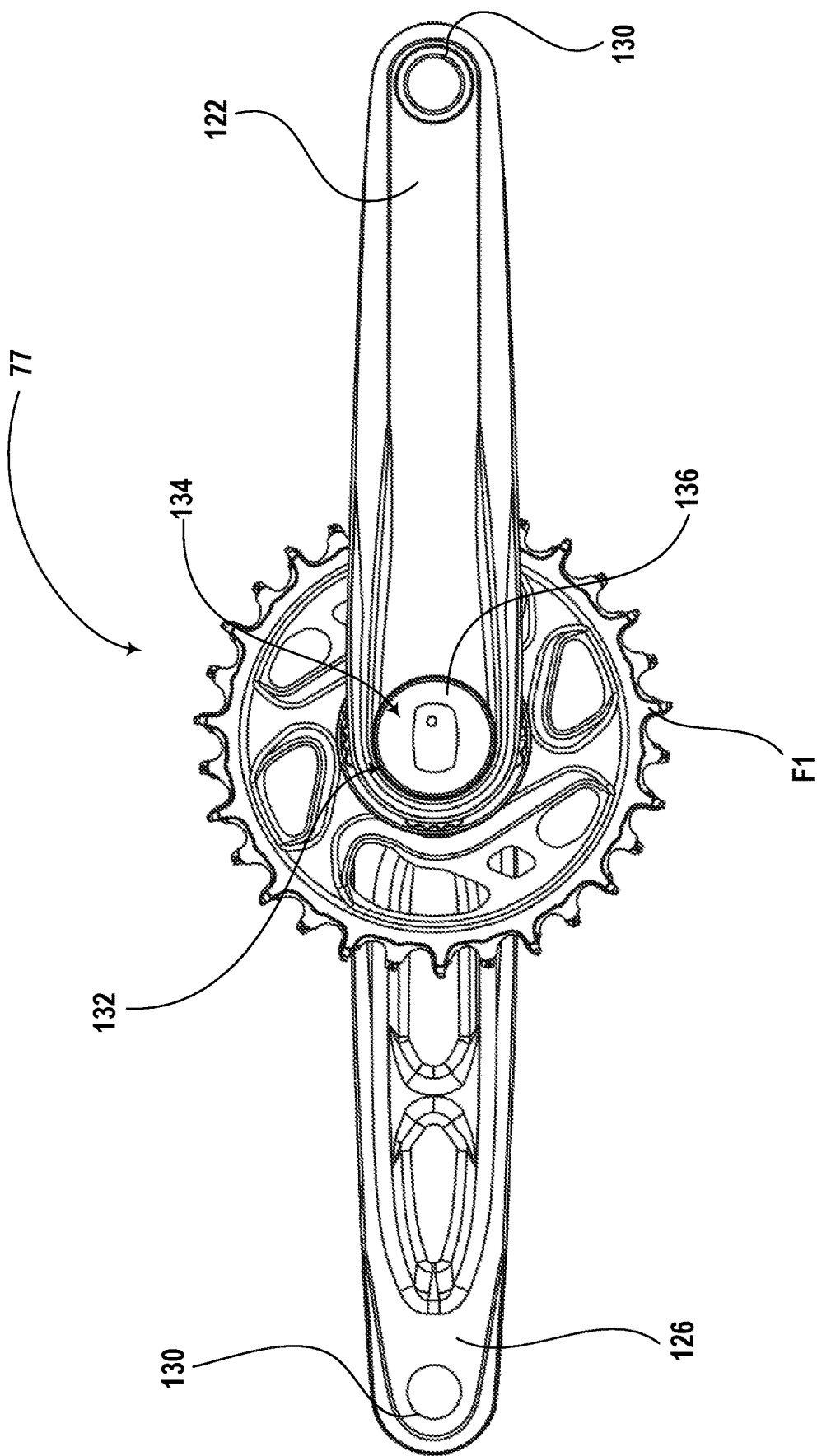
FIG. 4 is a front view of the crankset of FIG. 2.

Referring to FIGS. 2-4, the crankset 77 includes a housing 120 (e.g., a bracket or bottom bracket), one or more sprockets F (e.g., a chainring drive sprocket; the sprocket F1), a first arm 122 (e.g., a first crank or crankarm) connected to the bracket 120 at or adjacent to a first end 124 of the bracket 120, and a second arm 126 (e.g., a second crank or crankarm) connected to the bracket 120 at or adjacent to a second end 128 of the bracket 120 opposite the first end 124 of the bracket 120. FIGS. 2-4 show a single sprocket F. In other embodiments, the crankset 77 includes more than one sprocket F1 (e.g., two sprockets F, as shown in FIG. 1).

The bracket 120, and thus, the crankset 77, is attachable to the frame 52 of the bicycle 50 in any number of ways including, for example, via pressing into a corresponding opening in the frame 52 of the bicycle or via a threaded connection between the bracket 120 and the frame 52. The bracket 120 is attached to the frame 52, such that the bracket 120 is positionally fixed relative to the frame 52. The bracket 120 may be made of any number of materials including, for example, steel or a ceramic.

The bracket 120 is hollow and houses a number of components (see FIGS. 5 and 11-13). For example, the bracket 120 houses at least an axle (e.g., a spindle or a crankshaft), a first bearing assembly at or adjacent to the first end 124 of the bracket 120, and a second bearing assembly at or adjacent to the second end 128 of the bracket 120. The spindle extends through the bracket 120 and is held in position by the first bearing assembly and the second bearing assembly. The spindle functions as, for example, a torque transmission shaft. The spindle is longer than the bracket 120 such that the first arm 122 and the second arm 126 may be attached to the spindle outside of the bracket 120. Due to the connection of the spindle to the first bearing assembly and the second bearing assembly, the spindle is able to rotate relative to the bracket and thus, the frame 52 of the bicycle 50. In one embodiment, the crankset 77 does not include the bracket 120, and the first bearing assembly and the second bearing assembly are attached directly to the frame 52 of the bicycle 50.

The one or more sprockets F are attached to one of the first arm 122 and the second arm 126 (e.g., the second arm 126). For example, the second arm 126 and the one or more sprockets F are attached to each other with, for example, one or more connectors. For example, the sprocket F1 is disposed between the first arm 122 and the bracket 120, and a connection of the first arm 122 to the spindle with, for example, a bolt and a threaded opening in the spindle presses the sprocket F1 and the second arm 126 together. In one embodiment, the second arm 126, for example, and the one or more sprockets F are formed as a single integral part.

The first arm 122 is connected to the spindle at and/or adjacent to a first end of the spindle (e.g., adjacent to the first end 124 of the bracket 120), and the second arm 126 and the sprocket F1, for example, are connected to the spindle at and/or adjacent to a second end of the spindle (e.g., adjacent to the second end 128 of the bracket 120). The second end of the spindle is opposite the first end of the spindle.

The first arm 122 and the second arm 126 may be connected to the spindle in any number of ways. For example, the spindle may be hollow and may be tapped at the first end and/or the second end of the spindle, respectively, and one or more bolts may be used to attach the first arm 122 and/or the second arm 126 to the spindle. Other connectors may be used to attach the first arm 122 and/or the second arm 126 to the spindle. For example, one or more cotters may be used to attach the first arm 122 and/or the second arm 126 to the spindle. Alternatively or additionally, the spindle may be any number of different shapes to facilitate positioning and attachment of the first arm 122 and/or the second arm 126 to the spindle. For example, the spindle may be a square tapered spindle, a hexagonal tapered spindle, a splined bottom bracket spindle, or another type of spindle. The first arm 122 and/or the second arm 126 may be attached to the spindle in other ways.

The first arm 122 and the second arm 126 each include an attachment portion 130 for attaching a pedal (not shown) to the crank set 77. The attachment portions 130 are, for example, threaded openings via which the pedals are attached. Each of the pedals includes corresponding threading on a rod that interacts with a respective one of the attachment portions 130 to attach the respective pedal to the crank set 77.

The crank set 77 may include additional, fewer, and/or different components. For example, the crank set 77 may include one or more spacers. The size and/or number of spacers may be set based on a width of the frame 52 of the bicycle 50 and/or a width of the bracket 120, for example.

A power meter for a bicycle determines power output by a rider of the bicycle. A crank-based power meter includes, for example, a strain gauge that measures torque applied to a spindle (e.g., the spindle of the crank set 77). For crank-based power meters of the prior art, the strain gauge is positioned on an outer surface of the spindle. Such positioning exposes the strain gauge to potential damage during installation and the environment during riding of the bicycle.

Referring to FIGS. 3-4, the spindle is part of an axle assembly 132. The axle assembly 132 also includes a sensor assembly 134. The sensor assembly 134 is, for example, a power meter, though other sensor assemblies may be provided.

As discussed below, the sensor assembly 134 includes a removable portion 136 (e.g., a sled) and a fixed portion (e.g., a fixed strain gauge assembly). The removable portion 136 is supported by the spindle at and/or adjacent to the first arm 122. In another embodiment, the removable portion 136 is supported by the spindle at and/or adjacent to the second arm 126. The removable portion 136 is removably attachable and electrically connectable to the fixed portion. At least part of the fixed portion of the sensor assembly is positionally fixed relative to the spindle and includes one or more sensors. The one or more sensors include at least one strain gauge. Other types of sensors may be provided.

The one or more sensors are disposed on one or more inner surfaces (e.g., an inner wall), respectively, of the spindle. This positioning protects the one or more sensors from damage during installation and protects the one or more sensors from the environment during riding of the bicycle.

Figure 5:
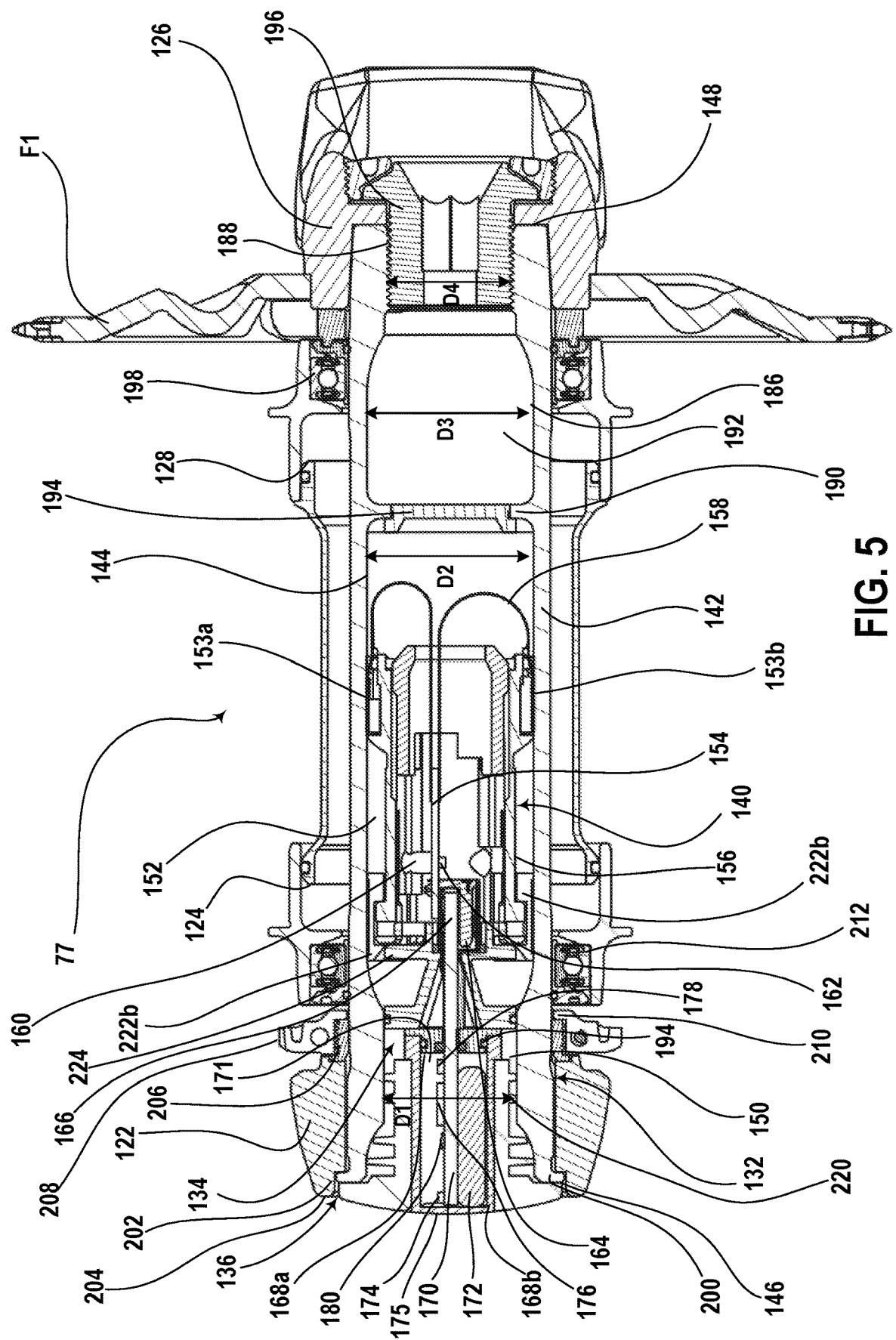
FIG. 5 is a side cross-sectional view of an axle assembly of the crankset of FIG. 2, with a removable portion of a sensor assembly physically connected to a fixed portion of the sensor assembly.

Referring to FIG. 5, both the removable portion 136 and the fixed portion 140 of the sensor assembly 134 are supported by the spindle 142. The spindle 142 has one or more inner walls 144 (e.g., an inner wall) extending along at least a portion of a length of the spindle 142 between a first end 146 and a second end 148 of the spindle 142 (e.g., between the first end 146 and a seal), and the inner wall 144 at least partially defines a first volume 150 and a second volume 152 within the spindle 142. The first volume 150 is closer to the first end 146 of the spindle 142 than the second volume 152 is relative to the first end 146 of the spindle 142. The first volume 150 has a first diameter D1, and the second volume 152 has a second diameter D2. The second diameter D2 is greater than the first diameter D1, such that the inner wall 144 is a necked inner wall. The first diameter D1 and the second diameter D2 may be any number of sizes. For example, the first diameter D1 may be 19 mm, and the second diameter D2 may be approximately 24 mm. Other dimensions of the first diameter D1 and the second diameter D2 may be provided.

The inner wall 144 shown in FIG. 5 is cylindrical with a varied sized circular cross-section along the length of the spindle 142. In other embodiments, the one or more inner walls 144 form other cross-sectional shapes. For example, the one or more inner walls 144 may include at least four walls that form a rectangular cross-section along at least part of the length of the spindle 142.

In the embodiment shown in FIG. 5, the fixed portion 140 of the sensor assembly 134 is disposed entirely within the second volume 152 within the spindle 142, and at least part of the removable portion 136 of the sensor assembly 134 is disposed within the first volume 150 within the spindle 142. In another embodiment, the removable portion 136 is disposed entirely within the first volume 150 within the spindle 142, and at least part of the fixed portion 140 is disposed within the second volume 152 within the spindle 142. In yet another embodiment, at least part of the removable portion 136 is disposed within the first volume 150 within the spindle 142, and at least part of the fixed portion 140 is disposed within the second volume 152 within the spindle 142. For example, the fixed portion 140 is disposed within both the second volume 152 and the first volume 150 within the spindle 142. The removable portion 136 may also be disposed within both the second volume 152 and the first volume 150 within the spindle 142.

The fixed portion 140 of the sensor assembly 134 includes one or more sensors 153. For example, as shown in the embodiment of FIG. 5, the fixed portion 140 of the sensor assembly may include two sensors (e.g., a first sensor 153a and a second sensor 153b). The fixed portion 140 may include more or fewer sensors 153. The one or more sensors 153 may include any number of different types of sensors. For example, the first sensor 153a and the second sensor 153b may be strain gauges. The one or more sensors 153 may include additional and/or different types of sensors.

The first sensor 153a and the second sensor 153b are disposed opposite each other on the inner wall 144 within the second volume 152 within the spindle 142, such that the first sensor 153a and the second sensor 153b face each other. In the embodiment shown in FIG. 5, the first sensor 153a and the second sensor 153b are both disposed entirely within the second volume 152 within the spindle 142. Other positioning of the first sensor 153a and the second sensor 153b relative to each other and relative to the spindle 142 may be provided.

The fixed portion 140 of the sensor assembly 134 is fixed in that at least part of the fixed portion 140 is positionally fixed relative to the spindle 142. For example, at least the first sensor 153a and the second sensor 153b are positionally fixed relative to the spindle 142. The first sensor 153a and the second sensor 153b are attached to (e.g., positionally fixed relative to) the spindle 142 with, for example, an adhesive (e.g., very high bond pressure sensitive adhesive (VHB PSA)).

The fixed portion 140 of the sensor assembly 134 includes any number of additional components. For example, as shown in the example of FIG. 5, the fixed portion 140 of the sensor assembly 134 includes a circuit board 154 (e.g., a printed circuit board (PCB)). The circuit board 154 is supported by a body 156 (e.g., a housing of a radially expandable applicator) of the fixed portion 140 of the sensor assembly 134.

The first sensor 153a and the second sensor 153b, for example, are attached and electrically connected to the PCB 154 in any number of ways including, for example, with flexible flat cables (FFCs) 158. Wires or other electrical conductors may be provided to electrically connect and attach the two sensors 153 to the PCB 154 of the fixed portion 140 of the sensor assembly 134. The FFCs 158, for example, are attached and electrically connected to the two sensors 153, respectively, and the PCB 154 via respective pads on the PCB 154.

The fixed portion 140 of the sensor assembly 134 may include a number of components supported by the PCB 154. For example, the fixed portion 140 of the sensor assembly 134 includes a controller 160 (e.g., a microcontroller) and one or more other electronic devices 162 (e.g., an analog-to-digital (A/D) converter or an amplifier) supported by the PCB 154. The controller 160 may be configured for communication with the removable portion 136. The A/D converter 162 may be configured to convert analog data generated by the two sensors 153, for example, to a digital signal. Such conversion may be provided so that analog data is not transmitted from the fixed portion 140 of the sensor assembly 134 to the removable portion 136 of the sensor assembly 134. For example, the A/D converter 162 may convert analog signals generated by the first sensor 153a and the second sensor 153b into digital signals, respectively. The fixed portion 140 of the sensor assembly 134 may transmit the digital signals to the removable portion 136 of the sensor assembly 134 when the removable portion 136 is electrically connected to the fixed portion 140.

In one embodiment, the fixed portion 140 of the sensor assembly 134 does not include an A/D converter but includes an amplifier 162. The amplifier amplifies the analog signals generated by the first sensor 153a and the second sensor 153, respectively. The fixed portion 140 of the sensor assembly 134 may transmit the amplified analog signals to the removable portion 136 of the sensor assembly 134 when the removable portion 136 is electrically connected to the fixed portion 140.

The controller 160 and the A/D converter 162 are electrically connected to each other via tracks of the PCB 154, and the controller 160 and the A/D converter 162 are electrically connected to the two sensors 153 via tracks and pads of the PCB 154, and the FFCs 158. The controller 160 and the A/D converter 162 may be supported by different sides of the PCB 154, as shown in FIG. 5, or may be supported by a same side of the PCB 154.

The fixed portion 140 of the sensor assembly 134 may include more, fewer, and/or different components. For example, the fixed portion 140 of the sensor assembly 134 also includes a memory. In one embodiment, the memory is part of the controller 160 and/or the A/D converter 162, and the fixed portion 140 of the sensor assembly 134 does not include a separate memory. In another embodiment, the fixed portion 140 of the sensor assembly 134 does not include the controller 160, and the A/D converter 162 is configured for communication with the removable portion 136 and for storing data.

The memory may store any number of different types of data for the sensor assembly 134. For example, the memory may store calibration data that is specific to a particular sensor assembly 134 installed on a particular bicycle. In other words, memories of different sensor assemblies 134 installed on different bicycles store different calibration data.

As another example, as shown in the example of FIG. 5, the fixed portion 140 of the sensor assembly 134 also includes a connector 164, to which the removable portion 136 is attachable and electrically connectable. The connector 164 may be any number of different types of connectors including, for example, a USB connector (e.g., a female USB connector). Power and data may be transmitted from the removable portion 136 to the fixed portion 140 of the sensor assembly 134 via the USB connector 164, for example, and data may be transmitted from the fixed portion 140 to the removable portion 136 of the sensor assembly 134 via the USB connector 164. Other types of connectors may be provided.

The removable portion 136 of the sensor assembly 134 is electrically connectable and physically attachable to the fixed portion 140 of the sensor assembly 134 via, for example, the connector 164. The removable portion 136 of the sensor assembly 134 includes a connector 166 that corresponds to the connector 164 of the fixed portion 140 of the sensor assembly 134. For example, the removable portion 136 includes a USB connector 166 (e.g., a male USB connector) that corresponds to the USB connector 164 of the fixed portion 140 of the sensor assembly 134. The USB connector 166 of the removable portion 136 of the sensor assembly 134 includes one or more electrical conductors 167 (e.g., see FIG. 7; a first pin for power, a second pin for GND, a third pin for RX, and a fourth pin for TX; serial communication with only the third pin for RX and the fourth pin for TX being used for communication with the USB connector 164 of the fixed portion 140 of the sensor assembly 134) via which the removable portion 136 of the sensor assembly 134 is electrically connectable to the fixed portion 140 of the sensor assembly 134. In one embodiment, standard asynchronous serial communication is used between the USB connector 164 of the fixed portion 140 and the USB connector 166 of the removable portion 136 of the sensor assembly 134, as standard asynchronous serial communication has a high enough data rate for this application and a low overhead.

Figure 6:
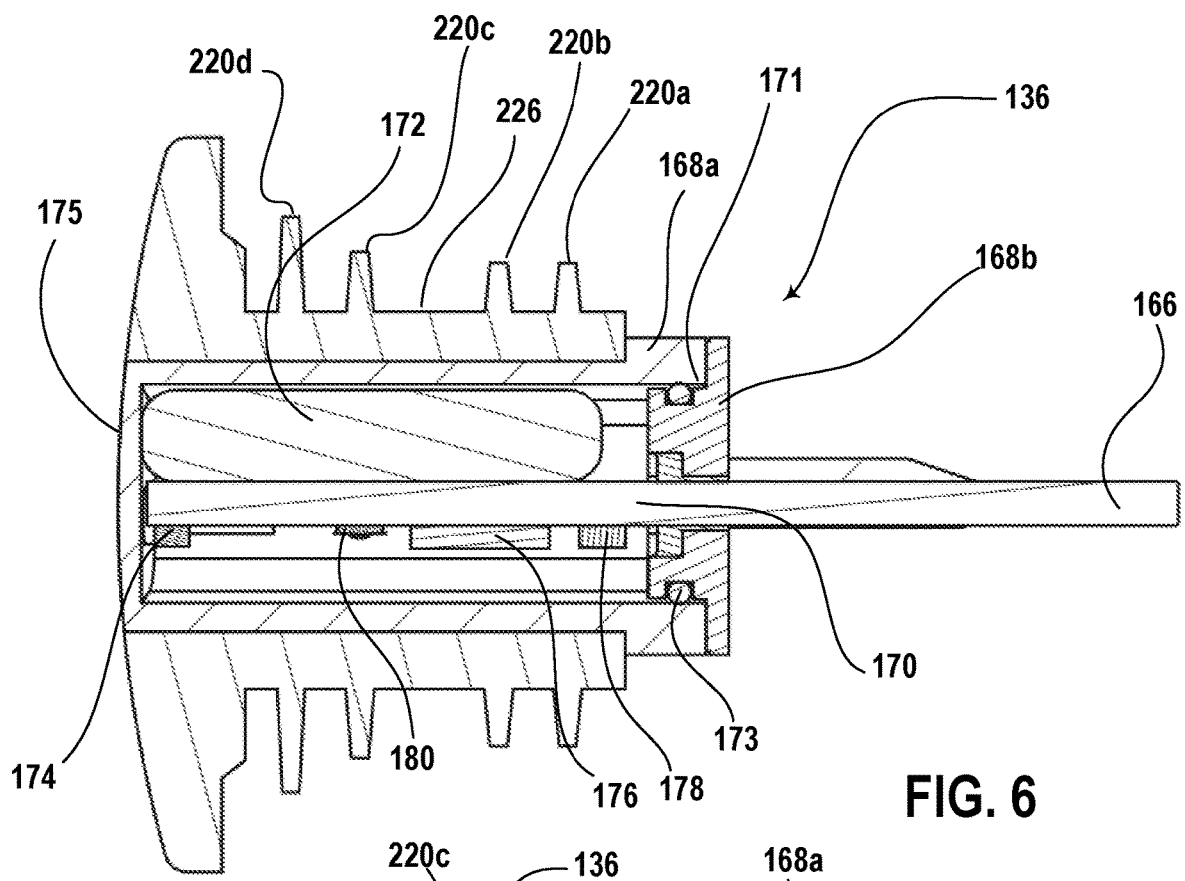
FIG. 6 is a side cross-sectional view of the removable portion of the sensor assembly of FIG. 5.

Referring to FIGS. 5-6, the removable portion 136 of the sensor assembly 134 includes a housing 168 that supports a circuit board 170 (e.g., a PCB). The housing 168 includes a main portion 168a and a removable door 168b that is attached (e.g., press fit or with one or more connectors) to the main portion 168a. The removable door 168b of the housing 168 includes an opening 171 through which the circuit board 170 and/or the USB connector 166 of the removable portion 136 of the sensor assembly 134 extends.

Components of the removable portion 136 of the sensor assembly 134 (e.g., a power source 172) are accessible via the removable door 168b. In the embodiment shown in FIGS. 5-6, the removable door 168b of the housing 168 also includes a seal 173 (e.g., a rubber O-ring) that, for example, helps protect components disposed within the main portion 168a of the housing 168 from moisture and debris.

The PCB 170 of the removable portion 136 of the sensor assembly 134 supports and electrically connects any number of components. For example, the PCB 170 supports and electrically connects the power source 172 to the USB connector 166 (e.g., via tracks of the PCB 170). The power source 172 may be any number of different types of power sources including, for example, a battery (e.g., a lithium ion battery).

When the removable portion 136 of the sensor assembly 134 is electrically connected to the fixed portion 140 of the sensor assembly 134 via the USB connectors 164, 166, the battery 172, for example, is electrically connected to components of the fixed portion 140 of the sensor assembly 134. For example, the battery 172 may power the two sensors 153, the controller 160, and/or the A/D converter 162 via the PCB 170 and the USB connector 166 of the removable portion 136 of the sensor assembly 134, and the USB connector 164 and the PCB 154 of the fixed portion 140 of the sensor assembly 134.

When the removable portion 136 of the sensor assembly 134 is disconnected from the fixed portion 140 of the sensor assembly 134 (e.g., the USB connector 166 of the removable portion 136 is removed from the USB connector 164 of the fixed portion 140) and removed from the bicycle 50, the battery 172 may be recharged via, for example, the USB connector 166 of the removable portion 136. For example, the USB connector 166 of the removable portion 136 may be plugged into a USB power adapter, and the USB power adapter may be plugged into a wall outlet. In one embodiment, the battery 172 is not rechargeable but is user replaceable.

The battery 172, for example, may be electrically connected and attached to the PCB 170 of the removable portion 136 of the sensor assembly 134 in any number of ways. For example, the removable portion 136 of the sensor assembly 134 may include a battery holder, in which the battery 172 is positionable, and pins and/or wires of the battery holder may be attached and electrically connected (e.g., soldered) to corresponding pads on the PCB 170 of the removable portion 136 of the sensor assembly 134. Other configurations may be provided.

The removable portion 136 of the sensor assembly 134 may include more and/or different components. For example, the removable portion 136 of the sensor assembly 134 may include an antenna 174 and/or a Bluetooth and ANT+ radio configured to communicate with other components on the bicycle 50 (e.g., the control device 100) and/or one or more computing devices outside of the bicycle 50.

In one embodiment, the antenna 174 is positioned on the PCB 170 of the removable portion 136 of the sensor assembly 134 opposite an outer end surface 175 of the removable portion 136, such that the antenna 174 is disposed outside of the spindle 142 when the removable portion 136 of the sensor assembly 134 is installed (e.g., attached to the fixed portion 140 of the sensor assembly 134). In another embodiment, the antenna 174 is within the spindle 142 but adjacent to the first end 146 of the spindle 142 when the removable portion 136 of the sensor assembly 134 is installed. The spindle 142 may act as a shield as to communications to and/or from the antenna 174. The positioning of the antenna 174 outside of the spindle 142 and/or adjacent to the first end 146 of the spindle 142 may thus provide for better communicating using the antenna 174 compared to other positioning of the antenna 174 within the spindle 142.

The removable portion 136 of the sensor assembly 134 may include other components. For example, the removable portion 136 of the sensor assembly 134 may include a controller 176 (e.g., a microcontroller), a memory 178, and a light-emitting diode (LED) 180 (see FIGS. 7-8). In one embodiment, the removable portion 136 includes additional, fewer, and/or different components. For example, the removable portion 136 of the sensor assembly 134 may include a voltage controller (e.g., to control current to power components of the fixed portion 140 of the sensor assembly 134), a voltage converter, a charge controller (e.g., to control charging current), one or more accelerometers, a button, and/or other components. In one embodiment, when the removable portion 136 of the sensor assembly 134 is electrically connected to the fixed portion 140 of the sensor assembly 134, current flows from the battery 172, via the voltage converter, through the USB connectors 164, 166 to power the fixed portion 140 of the sensor assembly 134.

The controller 176 of the removable portion 136 may process data received from outside of the sensor assembly 134 and/or data received from the fixed portion 140 of the sensor assembly 134. For example, the controller 176 may receive digital data representing forces measured by the two sensors 153 from the fixed portion 140 of the sensor assembly 134, and may calculate a power output based on the measured forces and a measured cadence (e.g., measured by one or more sensors at the first arm 122 and/or the second arm 126). The controller 176 may receive the measured cadence via, for example, the antenna 174. The calculated power may represent power for only one of the legs (e.g., the left leg). The controller 176 may also estimate a total power (e.g., for the left leg and the right leg) based on the calculated power.

The memory 178 may store any number of types of data. For example, the memory 178 may store historical values of the measured forces and/or the measured cadence, and/or may store historical values of the calculated power output. The memory 178 may store additional and/or different data.

Figure 7:
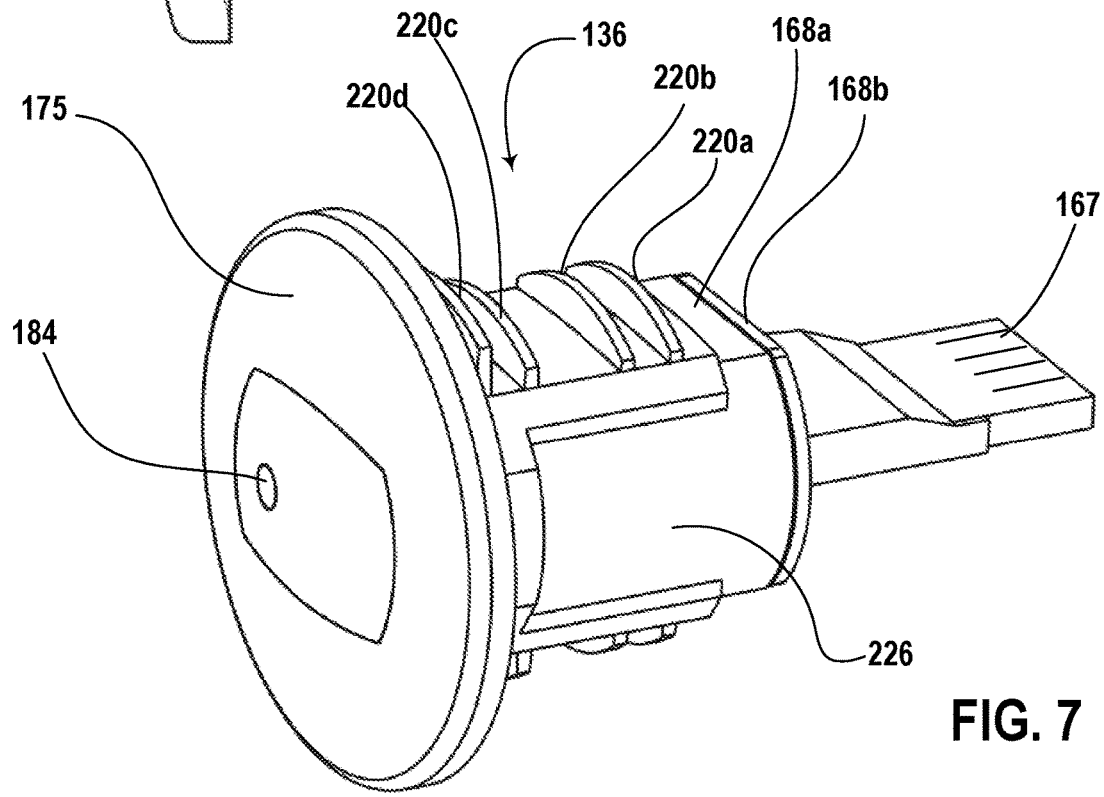
FIG. 7 is a perspective view of the removable portion of the sensor assembly of FIG. 5.
Figure 8:
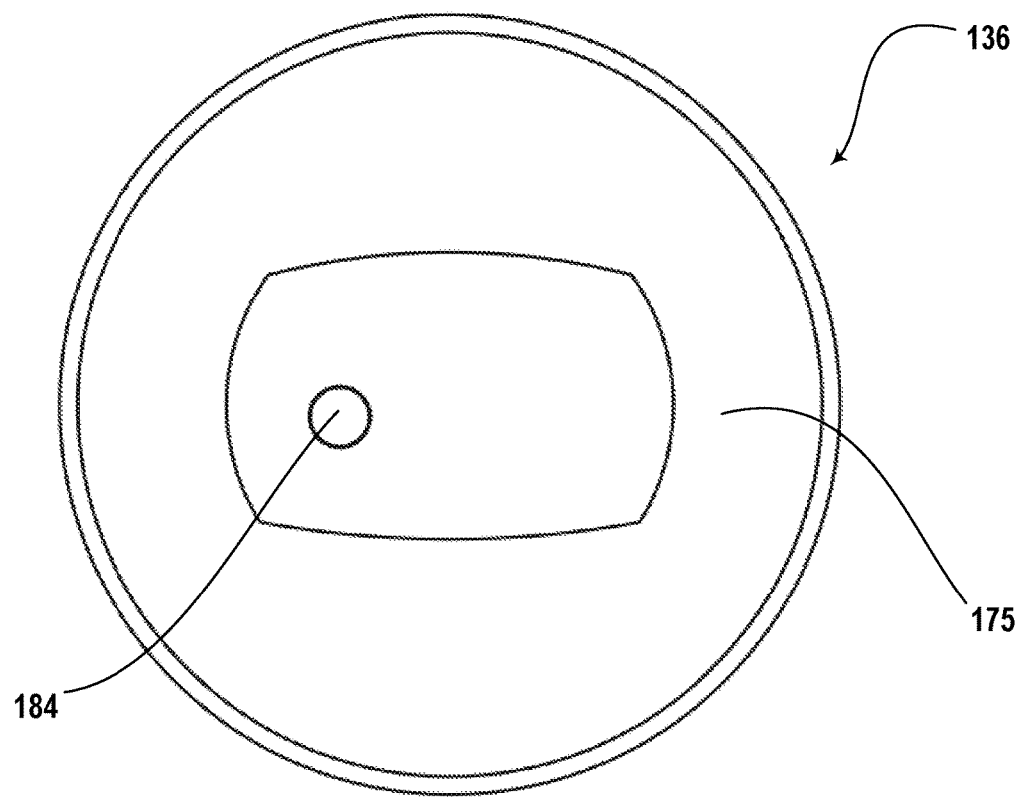
FIG. 8 is a front view of the removable portion of the sensor assembly of FIG. 5.

Referring to FIGS. 7-8, the housing 168 of the removable portion 136 of the sensor assembly 134 includes a window 184, and the LED 180 provides feedback to the rider of the bicycle 50, for example, via the window 184. The window 184 is, for example, a portion of the housing 168 that is made of transparent material.

The controller 176, for example, may be configured to turn on the LED 180 when the sensor assembly 134 is in any number of states. For example, the controller 176 may turn the LED 180 on and red when a charge level of the battery 172 is below a predetermined charge level. Further, the controller 176 may turn the LED 180 on and green when the charge level of the battery 172 is above the predetermined charge level, when the battery 172 is charging, and/or when the removable portion 136 of the sensor assembly 134 is electrically connected to the fixed portion 140 of the sensor assembly 134. Other feedback from the LED 180 may be provided.

Referring to FIGS. 5-6, the battery 172, the antenna 174, the controller 176, the memory 178, and the LED 180, for example, are electrically connected to each other via tracks of the PCB 170. The battery 172, and the antenna 174, the controller 176, the memory 178, and the LED 180 may be supported by different sides of the PCB 170, as shown in FIG. 5, or may be supported by a same side of the PCB 170.

The battery 172, the antenna 174, the controller 176, the memory 178, and the LED 180, for example, are electrically connected to the USB connector 166 via tracks and/or one or more pads of the PCB 170.

Again referring to FIG. 5, the inner wall 144 may define additional volumes within the spindle 142. For example, the inner wall 144 may at least partially define a third volume 186 and a fourth volume 188. The third volume 186 is adjacent to the second volume 152, and the third volume 186 is separated from the second volume 152 by a radially-inward extending flange 190 (e.g., a flange). The third volume 186 may be any number of sizes and/or shapes. For example, the third volume 186 may be cylindrically-shaped and may have a third diameter D3 that is a same size as the second diameter D2. Other sizes and/or shapes may be provided.

In one embodiment, the third volume 186 within the spindle 142 is filled with a filler 192. Any number of different types of fillers 192 including, for example, an epoxy may be provided in the third volume 186. The filler 192, with the removable portion 136 of the sensor assembly 134, when installed, protects the second volume 152, and thus, the sensors 153 of the fixed portion 140 of the sensor assembly 134, from the environment in which the axle assembly 132 is being used. For example, the filler 192 within the third volume 186 and the removable portion 136 of the sensor assembly 134, when installed, prevent water and debris from getting into the second volume 152 within the spindle 142. In the embodiment shown in FIG. 5, the axle assembly 132 also includes a seal 194 positioned on the flange 190. The seal 194 may be made of any number of materials including, for example, rubber, and fills an opening between the second volume 152 and the third volume 186 within the spindle 142. The seal 194 further protects the second volume 152, and thus, the sensors 153 of the fixed portion 140 of the sensor assembly 134, from the environment in which the axle assembly 132 is being used. In one embodiment, the axle assembly 132 does not include the seal and/or the filler 192.

The fourth volume 188 is adjacent to the third volume 186 and the second end 148 of the spindle 142. The fourth volume 188 may be any number of sizes and/or shapes. For example, the fourth volume 188 may be cylindrically-shaped and may have a fourth diameter D4 that is a same size as the first diameter D1. Other sizes and/or shapes may be provided.

In the embodiment shown in FIG. 5, the inner wall 144 is threaded within at least part of the fourth volume 188. The second arm 126 is attached to the second end 148 of the spindle 142 with a connector 196 via the threaded part of the fourth volume 188 within the spindle 142. The connector 196 may be any number of different types of connectors including, for example, a bolt. The sprocket F1 is disposed between the second bearing assembly 198 and the second arm 126. The second bearing assembly 198 presses the sprocket F1 against the second arm 126 when the second arm 126 is attached to the spindle 142 via the bolt 196 and the threaded part of the fourth volume 188 within the spindle 142.

The first end 146 of the spindle 142 includes a flange 200 that extends around a circumference of the spindle 142. The flange 200 of the spindle 142 is positioned within a corresponding channel 202 at an outer surface 204 of the first arm 122, such that the first arm 122 stays on the spindle 142. The first arm 122 includes a threaded portion 206, to which a spacer 208 may be attached. A part 210 of the spacer 208 is disposed between the first arm 122 and the first bearing assembly 212. In one embodiment, the spacer 208 is a bearing assembly preload adjuster that adjusts bearing preload for the first bearing assembly 212 and the second bearing assembly 198, and reduces or removes side-to-side play of the first arm 122 relative to the spindle 142.

The axle assembly 132 includes a number of features that facilitate positioning of the sensor assembly 134 within the spindle 142. Referring to FIG. 5, the axle assembly 132 includes protrusions 220 (e.g., flanges, ribs, retaining elements) extending from one or more outer surfaces of the removable portion 136 of the sensor assembly 134 (e.g., extending from the main portion 168a of the housing 168 of the removable portion 136), a base 222 that interacts with the fixed portion 140 of the sensor assembly 134, and a guide 224 that interacts with the fixed portion 140 of the sensor assembly 134 and/or the base 222.

Figure 9:
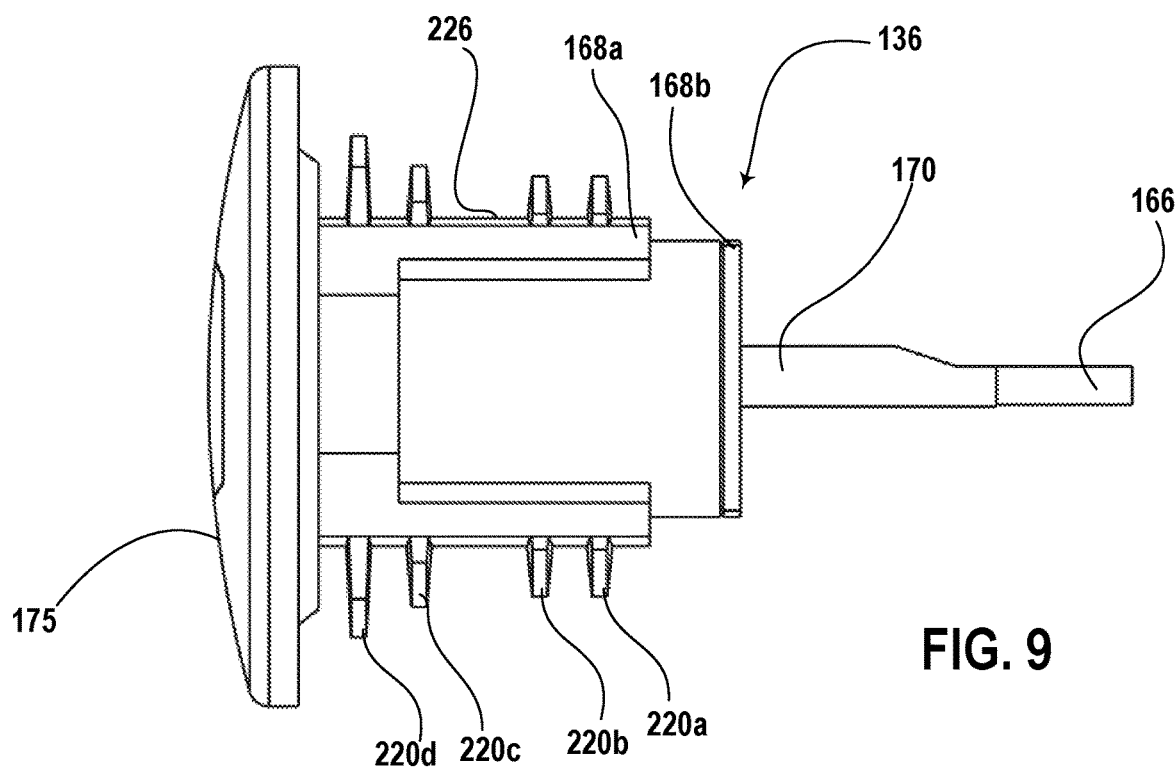
FIG. 9 is a side view of the removable portion of the sensor assembly of FIG. 5.

The flanges 220 extending from the removable portion 136 of the sensor assembly 134 facilitate insertion into and positioning relative to the spindle 142. For example, in one embodiment (see FIGS. 6, 7, and 9), the removable portion 136 of the sensor assembly 134 includes one or more outer surfaces 226 (e.g., two opposite flat surfaces or a circumferential surface) that are disposable within the spindle 142 when the removable portion 136 is installed in the axel assembly 132. The flanges 220 are spaced apart from each other along the one or more outer surfaces 226 and extend along or around the one or more outer surface 226.

The flanges 220 are sized such that the flanges 220 abut the inner wall 144 of the spindle 142 when the removable portion 136 is installed. For example, a first flange 220a and a second flange 220b are sized (e.g., have a height) to abut the inner wall 144 within the first volume 150 within the spindle 142 when the removable portion 136 is installed. A third flange 220c and a fourth flange 220d each have a greater height than a height of the first flange 220a and the second flange 220b, such that the third flange 220c and the fourth flange 220d abut the inner wall 144 of the spindle 142 within a fifth volume 228 within the spindle 142 that is adjacent to the first end 146 of the spindle 142. More or fewer flanges may be provided on the removable portion 136 of the sensor assembly 134 to facilitate insertion and positioning of the removable portion 136 of the sensor assembly 134 relative to the spindle 142.

In one embodiment, the flanges 220 are made of a compliant material (e.g., rubber). In another embodiment, the flanges 220 are rigid and made of a same material as the rest of the main portion 168a of the housing 168 of the removable portion 136 of the sensor assembly 134.

The base 222 is attached to the inner wall 144 of the spindle 142, and at least part of the base 222 is disposed within the second volume 152 of the spindle 142. The base 222 may be attached to the inner wall 144 of the spindle 142 in any number of ways including, for example, with an adhesive (e.g., a VHB PSA). In the embodiment shown, the base 222 is formed by two separate base parts 222a, 222b (e.g., base insets) that are disposed opposite each other on the inner wall 144 within the second volume 152 of the spindle 142.

In one embodiment, prior to attachment to the spindle 142, the two separate base parts 222a, 222b are attached to an expandable installation tool. The expandable installation tool, with the two separate base parts 222a, 222b attached, fits through the first volume 150 within the spindle 142 and into the second volume 152 within the spindle 142. In other words, a maximum diameter of the expandable installation tool, with the two separate base parts 222a, 222b attached, is smaller than the first diameter D1 of the first volume 150 within the spindle 142.

The installation tool is expanded, such that the two separate base parts 222a, 222b are pressed against and adhered to the inner wall 144 within, for example, the second volume 152 within the spindle 142. The installation tool is collapsed and removed from the spindle 142. The expandable installation tool locates and clocks the two separate base parts 222a, 222b. In other words, the expandable installation tool is configured to fit on and in the spindle 142 such that the two separate base parts 222a, 222b are installed on the inner wall 144 of the spindle 142 in predetermined positions (e.g., circumferentially relative to the inner wall 144 of the spindle 142 and at particular distances into the second volume 152 within the spindle 142), respectively.

Figure 10:
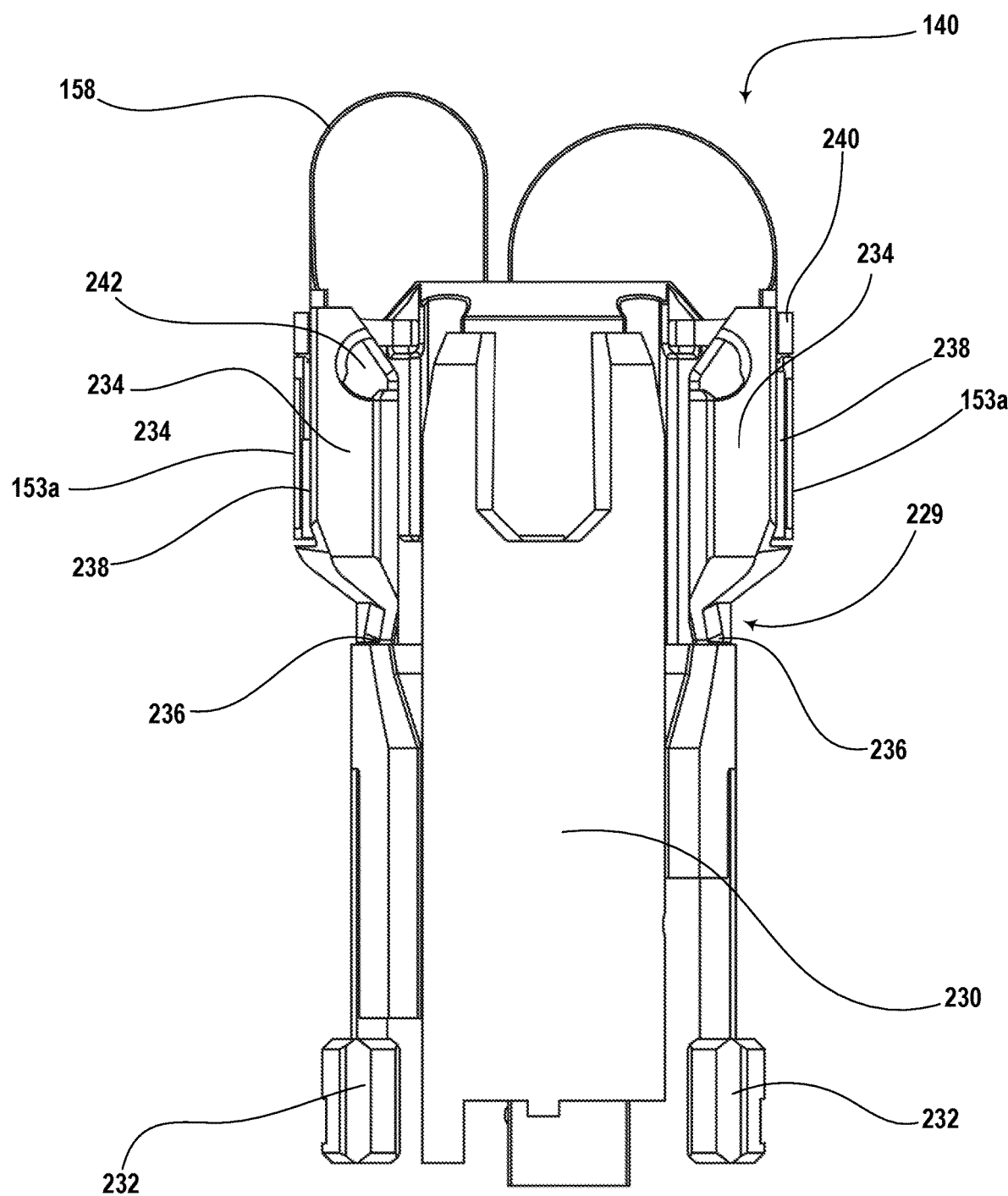
FIG. 10 is a side view of the fixed portion of the sensor assembly of FIG. 5.

Referring to FIG. 10, the fixed portion 140 of the sensor assembly 134 includes a radially expandable applicator 229 that is formed by a body 230, retaining elements 232 supported by the body 230, and wings 234 (e.g., two wings) supported by the body 230. In one embodiment, the radially expandable applicator 229 (e.g., the body 230, the retaining elements 232, and the wings 234) is formed as a single molded part. In another embodiment, one or more of the body 230, the retaining elements 232, the wings 234 are separate parts attached to the rest of the fixed portion 140 of the sensor assembly 134.

Referring to FIG. 5, the retaining elements 232 are sized and shaped to fit into (e.g., clip or snap into) corresponding recesses within the two separate base parts 222a, 222b, respectively. When the retaining elements 232 of the fixed portion 140 of the sensor assembly 134 are snapped into the two separate base parts 222a, 222b, respectively, at least part of the fixed portion 140 of the sensor assembly 134 is positionally fixed and clocked relative to the inner wall 144 of the spindle 142.

Referring again to FIG. 10, the wings 234 are expandable and retractable. For example, the wings 234 are attached to the body 230 via active hinges 236 that allow the wings 234 to move away from each other and/or towards each other. Each of the wings 234 supports a respective strain gauge 153. For example, a first of the wings 234a supports the first strain gauge 153a, and a second of the wings 234b supports the second strain gauge 153b.

In one embodiment, the first strain gauge 153a and the second strain gauge 153b are attached to the first wing 234a and the second wing 234b via a first layer of material 238a (e.g., a first pad) and a second layer of material 238b (e.g., a second pad), respectively. Referring to FIGS. 5 and 10, one side of the first pad 238a is attached to the first wing 234a with an adhesive, and the first strain gauge 153a is attached to another, opposite side of the first pad 238a with the adhesive or another adhesive. One side of the second pad 238b is attached to the second wing 234b with an adhesive, and the second strain gauge 153b is attached to another, opposite side of the second pad 238b with the adhesive or another adhesive.

The first pad 238a and the second pad 238b may be made of any number of materials. For example, the first pad 238a and the second pad 238b may be made of silicone, rubber, or silicone rubber. Other materials may be used.

The first pad 238a and the second pad 238b may be any number of sizes (e.g., thicknesses). Even pressure on the strain gauges 153 while the first pad 238a and the second pad 238b are adhered to the inner wall 144 of the spindle 142 increases the chances of successful bonding. A bonding pressure may be varied by varying a compression on the first pad 238a and the second pad 238b. The compression may be varied by changing the thickness of the first pad 238a and the second pad 238b. In other words, the thickness of the first pad 238a and the second pad 238b may be set based on the bonding pressure to be provided for adhering the first pad 238a and the second pad 238b to the inner wall 144 of the spindle 142. A hardness of the first pad 238a and the second pad 238b may also be set (e.g., the material of the first pad 238a and the second pad 238b may be chosen) based on the bonding pressure to be provided.

Referring to FIGS. 5 and 10, the fixed portion 140 of the sensor assembly 134 may include fasteners 240 (e.g., clips) that further attach the strain gauges 153 to the wings 234, respectively. The clips 240 locate and support the strain gauges 153, respectively. During installation of the fixed portion 140 of the sensor assembly 134 (e.g., the attachment of the strain gauges 153 to the inner wall 144 of the spindle 142), the clips 240 push out of the way and form part of a flexible circuit between the strain gauges 153 and the PCB 154 of the fixed portion 140 of the sensor assembly 134.

Figure 11:
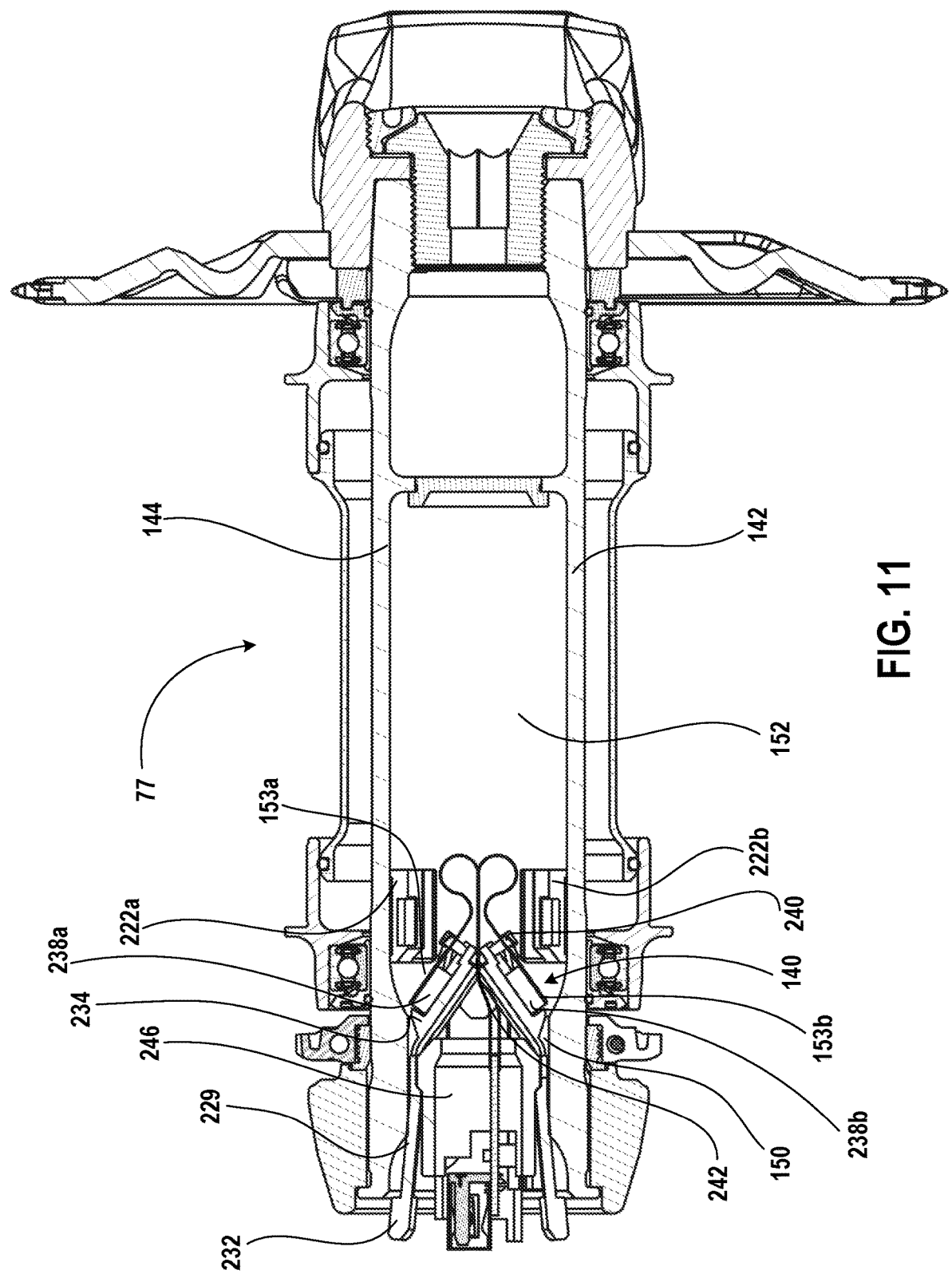
FIG. 11 is a side cross-sectional view of an axle assembly of the crankset of FIG. 2, with a fixed portion of a sensor assembly in a first position during installation.
Figure 12:
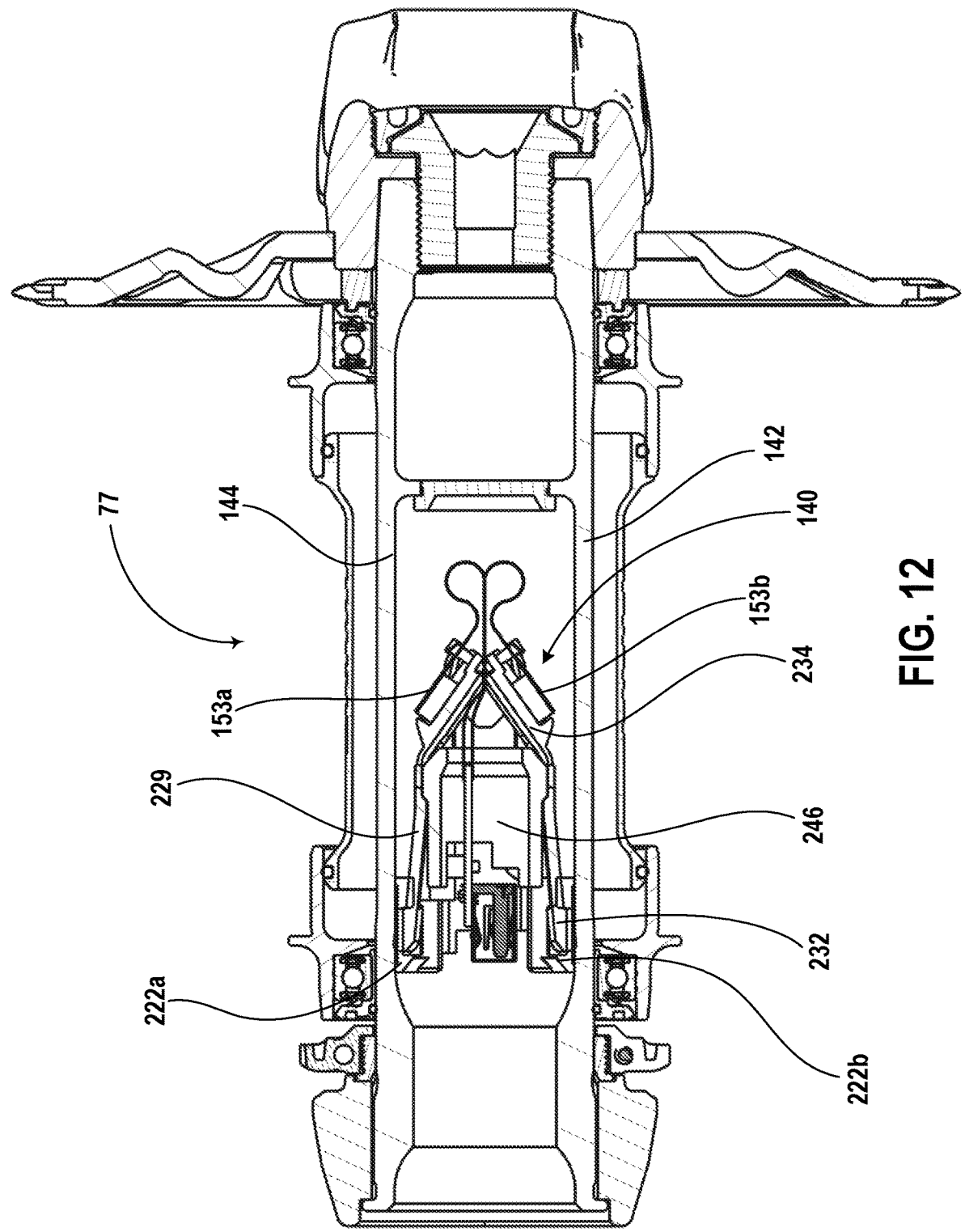
FIG. 12 is a side cross-sectional view of an axle assembly of the crankset of FIG. 2, with a fixed portion of a sensor assembly in a second position during installation.
Figure 13:
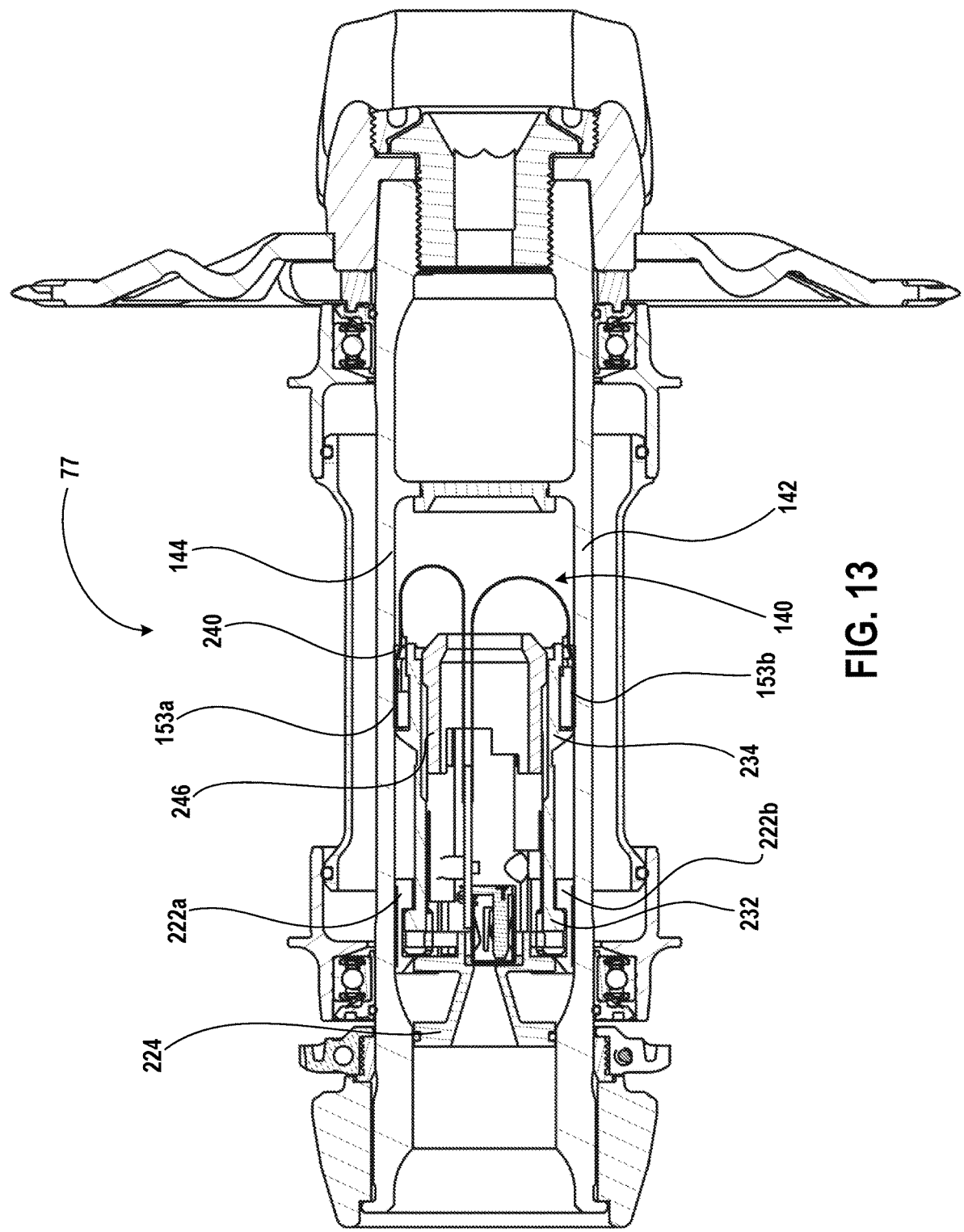
FIG. 13 is a side cross-sectional view of an axle assembly of the crankset of FIG. 2, with a fixed portion of a sensor assembly installed.

FIGS. 11-13 illustrate an exemplary installation process for the fixed portion 140 of the sensor assembly 134. As shown in FIG. 11, after the two separate base parts 222a, 222b have been installed (e.g., adhered to the inner wall 144 of the spindle 142), the fixed portion 140 of the sensor assembly 134 is moved into the spindle 142. The radially expandable applicator 229 is in a first configuration. The first configuration of the radially expandable applicator 229 is a closed configuration that allows the fixed portion 140 of the sensor assembly 134 to move through the first volume 150 within the spindle 142. In one embodiment, the radially expandable applicator 229 is kept in the closed configuration (see FIGS. 10-12) with one or more fasteners 242 (e.g., two fasteners; two sets of snaps or clasps on opposite sides of the radially expandable applicator 229). The two fasteners 242, for example, keep the wings 234 folded in while the fixed portion 140 of the sensor assembly 134 is moved through the spindle 142 (e.g., through the first volume 150 within the spindle 142).

A tool (not shown) may be used to move the fixed portion 140 of the sensor assembly 134 through a portion of the spindle 142 (e.g., through the first volume 150 within the spindle 142 and part of the second volume 152 within the spindle 142). The tool interacts with a force applicator 246 (e.g., a pusher) positioned within and/or against the fixed portion 140 of the sensor assembly 134 (e.g., within the radially expandable applicator 229) to move the pusher 246, and thus the fixed portion 140 of the sensor assembly 134, through part of the spindle 142. The pusher 246 may be any number of shapes (e.g., cylindrical) and sizes. For example, the pusher 246 may be sized based on the bonding pressure to be provided. The pusher 246 remains within the spindle 142 after the fixed portion 140 of the sensor assembly 134 is installed.

Referring to FIG. 12, the tool and the pusher 246 are used to move the fixed portion 140 of the sensor assembly 134 into contact with and attachment to the base parts 222a, 222b via, for example, the retaining elements 232 of the radially expandable applicator 229.

Referring to FIG. 13, once the retaining elements 232 of the radially expandable applicator 229 of the fixed portion 140 of the sensor assembly 134 are attached to the base parts 222a, 222b, the tool is then used to move the pusher 246 further into the spindle 142, and thus the radially expandable applicator 229. This movement applies pressure to the wings 234 of the radially expandable applicator 229 until the two fasteners 242 release, and the wings 234 move radially outward towards the inner wall 144 of the spindle 142. Each of the strain gauges 153 includes a layer of adhesive disposed on an exposed surface (e.g., a surface facing the inner wall 144) of the respective strain gauge 153, such that as the pusher 246 moves further into the radially expandable applicator 229, the wings 234 hinge towards the inner wall 144 of the spindle 142 until the strain gauges 153 are connected to the inner wall 144 of the spindle 142 via the layers of adhesive disposed on the exposed surfaces of the strain gauges 153, respectively.

FIG. 13 illustrates a second configuration of the radially expandable applicator 229. The second configuration of the radially expandable applicator 229 is an open configuration in which the strain gauges 153 are connected to the inner wall 144 of the spindle 142 via the layers of adhesive, respectively. FIG. 13 also illustrates a final position of the pusher 246 within the radially expandable applicator 229 once installation of the fixed portion 140 of the sensor assembly 134 is complete. In this position, the pusher 246 and the wings 234 press the strain gauges 153 to the inner wall 144 of the spindle 142 until the adhesive between the strain gauges 153 and the inner wall 144 of the spindle 142 cures.

The guide 224 is then attached to one or more of the two separate base parts 222a, 222b and/or the radially expandable applicator 229. For example, the guide may be sized and shaped to be press fit onto the two separate base parts 222a, 222b and/or the radially expandable applicator 229. An inner portion of the guide 224 may be triangularly-shaped to guide, for example, the USB connector 166 of the removable portion 136 of the sensor assembly 134 towards the USB connector 164 of the fixed portion 140 of the sensor assembly 134, and thus, electrically connect and physically attach the removable portion 136 to the fixed portion 140 of the sensor assembly 134. Other configurations of the guide 224 may be provided. In one embodiment, the axle assembly 132 does not include the guide 224.

Once the fixed portion 140 of the sensor assembly 134 is installed within the spindle 142 of the axle assembly 132, the removable portion 136 of the sensor assembly 134 may be physically and electrically connected to the fixed portion 140. The battery 172, for example, then powers the strain gauges 153, which measure forces on the spindle 142 (e.g., generate analog data that represents the forces on the spindle 142). The fixed portion 140 of the sensor assembly 134 converts the generated analog data into digital data and transmits the digital data, which represents the measured forces, to the removable portion 136 of the sensor assembly 134. The removable portion 136 of the sensor assembly 134 calculates a power output by a rider based on the digital data received at the removable portion 136. The removable portion 136 of the sensor assembly 134 transmits the calculated power output to one or more other components of the bicycle 50 (e.g., the control device) and/or outside of the bicycle 50 (e.g., a mobile device).

The attachment of the strain gauges 153 to the inner wall 144 of the spindle 142 protects the strain gauges 153 from the environment in which the bicycle 50 is being ridden, and protects the strain gauges 153 from damage during installation of the crank assembly 77 on the bicycle 50. Further, by mounting the strain gauges 153 inside the spindle 142, the spindle 142 does not require a hole through which gauge signal and power wires are passed.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. An axle assembly for a bicycle, the axle assembly comprising:
    an axle having an inner wall extending along a length of the axle between a first end and a second end of the axle, the inner wall at least partially defining a first volume and a second volume within the axle, the first volume having a first diameter and the second volume having a second diameter that is greater than the first diameter, the first volume being closer than the second volume to the first end of the axle; and
    a sensor attached to the inner wall of the axle within the second volume of the axle.

2. The axle assembly of claim 1, further comprising a sensor assembly, the sensor assembly comprising a fixed portion, the fixed portion including the sensor and at least part of the fixed portion being positionally fixed relative to the axle,
    wherein the sensor of the fixed portion of the sensor assembly is disposed entirely within the second volume of the axle.

3. The axle assembly of claim 2, wherein the sensor assembly further comprises a removable portion, the removable portion being removably attachable and electrically connectable to the fixed portion, and
    wherein at least part of the removable portion of the sensor assembly is disposed within the first volume of the axle.

4. The axle assembly of claim 3, wherein the sensor assembly is a power meter, and
    wherein the sensor is a strain gauge.

5. The axle assembly of claim 4, wherein the strain gauge is a first strain gauge,
    wherein the fixed portion of the sensor assembly further comprises a second strain gauge, and
    wherein the first strain gauge and the second strain gauge are attached to the inner wall within the second volume of the axle, such that the first strain gauge and the second strain gauge are opposite each other.

6. The axle assembly of claim 5, wherein the removable portion of the sensor assembly comprises a power source electrically connectable to the first strain gauge and the second strain gauge.

7. The axle assembly of claim 6, wherein the fixed portion of the sensor assembly further comprises a circuit board electrically connected to the first strain gauge and the second strain gauge, and
    wherein the power source is electrically connected to the first strain gauge and the second strain gauge via the circuit board.

8. The axle assembly of claim 7, wherein the fixed portion of the sensor assembly further comprises a memory electrically connected to the circuit board, and wherein the memory is configured to store calibration data for the sensor assembly.

9. The axle assembly of claim 7, wherein the fixed portion of the sensor assembly further comprises an analog-to-digital (A/D) converter supported by the circuit board, the A/D converter being in communication with the first strain gauge and the second strain gauge,
wherein the first strain gauge is configured to generate a first analog signal, and the second strain gauge is configured to generate a second analog signal, the first analog signal and the second analog signal being analog representations of strain on the axle, respectively,
wherein the A/D converter is configured to convert the first analog signal to a first digital signal, convert the second analog signal to a second digital signal, generate a third digital signal that is based on the first analog signal and the second analog signal, or any combination thereof, the first digital signal, the second digital signal, and the third digital signal being digital representations of strain on the axle, respectively, and
wherein the fixed portion of the sensor assembly is configured to transmit the first digital signal, the second digital signal, the third digital signal, or any combination thereof to the removable portion of the sensor assembly when the removable portion of the sensor assembly is electrically connected to the fixed portion of the sensor assembly.

10. The axle assembly of claim 7, wherein the fixed portion of the sensor assembly further comprises an amplifier in communication with the first strain gauge and the second strain gauge,
wherein the first strain gauge is configured to generate a first analog signal, and the second strain gauge is configured to generate a second analog signal, the first analog signal and the second analog signal being analog representations of strain on the axle, respectively,
wherein the amplifier is configured to amplify the first analog signal to a first amplified analog signal, amplify the second analog signal to a second amplified analog signal, amplify a signal based on the first analog signal and the second analog signal to a third amplified analog signal, or any combination thereof, and
wherein the fixed portion of the sensor assembly is configured to transmit the first amplified analog signal, the second amplified analog signal, the third amplified analog signal, or any combination thereof to the removable portion of the sensor assembly when the removable portion of the sensor assembly is electrically connected to the fixed portion of the sensor assembly.

11. The axle assembly of claim 5, wherein the fixed portion of the sensor assembly comprises a radially expandable applicator attached to the first strain gauge and the second strain gauge, the radially expandable applicator operable to move the first strain gauge and the second strain gauge radially outwards until the first strain gauge and the second strain gauge are physically connected to the inner wall.

12. The axle assembly of claim 11, wherein the fixed portion of the sensor assembly further comprises a first layer of adhesive disposed on the first strain gauge and a second layer of adhesive disposed on the second strain gauge, the first strain gauge and the second strain gauge being attached to the inner wall of the axle via the first layer of adhesive and the second layer of adhesive, respectively.

13. The axle assembly of claim 12, wherein the fixed portion of the sensor assembly further comprises:

a first layer of material having a first side and a second side opposite the first side, the first side of the first layer of material being attached to the radially expandable applicator and the second side of the first layer of material being attached to the first strain gauge; and
a second layer of material having a first side and a second side opposite the first side, the first side of the second layer of material being attached to the radially expandable applicator and the second side of the second layer of material being attached to the second strain gauge.

14. The axle assembly of claim 13, wherein the first layer of material and the second layer of material are made of rubber or silicon.

15. The axle assembly of claim 11, wherein the fixed portion of the sensor assembly further comprises a base attached to the inner wall of the axle, and
wherein the radially expandable applicator is physically connected to the base, such that a depth of the radially expandable applicator relative to the first end of the axle is fixed and a clocking of the radially expandable applicator is fixed relative to the inner wall.

16. A crankset for a bicycle, the crankset comprising:
an axle having an inner wall extending along a length of the axle between a first end and a second end of the axle, the inner wall at least partially defining a first volume and a second volume within the axle, the first volume having a first diameter and the second volume having a second diameter that is greater than the first diameter, the first volume being closer than the second volume to the first end of the axle;
a first arm attached to the axle at the first end of the axle;
a second arm attached to the axle at the second end of the axle;
at least one crank attached to the first arm or the second arm; and
a sensor assembly comprising a fixed portion, at least part of the fixed portion being positionally fixed relative to the inner wall of the axle,
wherein the fixed portion comprises a sensor that is attached to the inner wall of the axle within the second volume of the axle.

17. The crankset of claim 16, wherein the sensor is a first strain gauge,
wherein the fixed portion of the sensor assembly further comprises a second strain gauge, and
wherein the first strain gauge and the second strain gauge are attached to the inner wall within the second volume of the axle, such that the first strain gauge and the second strain gauge are opposite each other.

18. The crankset of claim 17, wherein the fixed portion of the sensor assembly further comprises:
a radially expandable applicator operable to move the first strain gauge and the second strain gauge radially outwards into contact with the inner wall, the first strain gauge and the second strain gauge each having a first side and a second side opposite the first side;
a first layer of material having a first side and a second side opposite the first side, the first side of the first layer of material being attached to the radially expandable applicator and the second side of the first layer of material being attached to the first side of the first strain gauge;
a second layer of material having a first side and a second side opposite the first side, the first side of the second layer of material being attached to the radially expandable applicator and the second side of the second layer of material being attached to the first side of the second strain gauge; and a first layer of adhesive disposed on the second side of the first strain gauge and a second layer of adhesive disposed on the second side of the second strain gauge, the first strain gauge and the second strain gauge being attached to the inner wall of the axle via the first layer of adhesive and the second layer of adhesive, respectively.

19. The crankset of claim 16, wherein the sensor assembly further comprises a removable portion that is removably attachable and electrically connectable to the fixed portion of the sensor assembly.

20. An axle for a bicycle, the axle comprising:

an inner wall extending along a length of the axle between a first end and a second end of the axle, the inner wall at least partially defining a first volume and a second volume within the axle, the first volume having a first diameter and the second volume having a second diameter that is greater than the first diameter, the first volume being closer than the second volume to the first end of the axle;

a first sensor attached to the inner wall within the second volume; and a second sensor attached to the inner wall within the second volume, the second sensor being opposite the first sensor.

* * * * *